(12) United States Patent
Sigmund et al.

(10) Patent No.: US 9,475,105 B2
(45) Date of Patent: Oct. 25, 2016

(54) ARTICLES HAVING SUPERHYDROPHOBIC AND OLEOPHOBIC SURFACES

(75) Inventors: Wolfgang M. Sigmund, Gainesville, FL (US); Shu-Hau Hsu, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 13/884,059

(22) PCT Filed: Nov. 8, 2011

(86) PCT No.: PCT/US2011/059790
§ 371 (c)(1),
(2), (4) Date: May 8, 2013

(87) PCT Pub. No.: WO2012/064745
PCT Pub. Date: May 18, 2012

(65) Prior Publication Data
US 2013/0230695 A1 Sep. 5, 2013

Related U.S. Application Data

(60) Provisional application No. 61/411,246, filed on Nov. 8, 2010.

(51) Int. Cl.
*B08B 17/06* (2006.01)
*B05D 5/00* (2006.01)
(Continued)

(52) U.S. Cl.
CPC ............ *B08B 17/065* (2013.01); *B05D 1/62* (2013.01); *B05D 5/00* (2013.01); *B29C 33/424* (2013.01);
(Continued)

(58) Field of Classification Search
None
See application file for complete search history.

(56) References Cited

U.S. PATENT DOCUMENTS 5,397,365 A * 3/1995 Trentacosta ............... 623/18.11
5,888,591 A * 3/1999 Gleason et al. ............. 427/522
(Continued)

FOREIGN PATENT DOCUMENTS

CN        1986651       6/2007
WO    WO 93/00394   *  1/1993   ............... C08J 7/18
(Continued)

OTHER PUBLICATIONS

M. Im; H. Im; J. Lee; J. Yoon; Y. Choi; "A robust superhydrophobic and superoleophobic surface with inverse-trapezoidal microstructures on a large transparent flexible substrate". Soft Matter (2010), 6, p. 1401-1404.*

(Continued)

*Primary Examiner* — David Sample
*Assistant Examiner* — Donald M Flores, Jr.
(74) *Attorney, Agent, or Firm* — Saliwanchik, Lloyd & Eisenschenk

(57) ABSTRACT

A superhydrophobic and oleophobic thermoplastic article has a surface with a multiplicity of re-entrant structures extending from the article's surface where a conformal coating comprising a perfluoroalkane covers at least the distal portion of the re-entrant structures. The thermoplastic article can be prepared by contacting a heated thermoplastic and a mold with voids with a sufficient pressure to cause the thermoplastic to extend into the voids to form features that upon removal of the mold results in re-entrant structures. The surface having the re-entrant structures is conformally coated with a compound comprising a perfluoroalkane. Alternately microparticles or nanoparticles and a resin can be deposited on substrate and cured to adhere or mechanically fix the particles where a portion thereof forms re-entrant structures. The microparticles or nanoparticles can comprise a perfluoroalkane or can be conformally coated with a compound comprising a perfluoroalkane, to render the surface superhydrophobic and oleophobic.

15 Claims, 19 Drawing Sheets

(51) Int. Cl.
| | |
|---|---|
| B05D 1/00 | (2006.01) |
| B29C 33/42 | (2006.01) |
| B29C 37/00 | (2006.01) |
| C08J 7/04 | (2006.01) |
| B29K 105/16 | (2006.01) |

(52) U.S. Cl.
CPC ............ *B29C 37/0053* (2013.01); *C08J 7/047* (2013.01); *B29K 2105/162* (2013.01); *C08J 2427/12* (2013.01); *Y10T 428/24355* (2015.01); *Y10T 428/24372* (2015.01)

(56) References Cited

U.S. PATENT DOCUMENTS

| | | | |
|---|---|---|---|
| 2002/0192385 A1* | 12/2002 | Jenkner et al. | 427/387 |
| 2009/0077745 A1 | 3/2009 | Chou | |
| 2009/0318717 A1 | 12/2009 | Virtanen et al. | |
| 2010/0047523 A1* | 2/2010 | Kim et al. | 428/144 |
| 2010/0089529 A1* | 4/2010 | Barholm-Hansen et al. | 156/247 |
| 2010/0252177 A1* | 10/2010 | Sargent et al. | 428/156 |
| 2010/0285272 A1* | 11/2010 | Koval et al. | 428/141 |
| 2010/0316842 A1* | 12/2010 | Tuteja et al. | 428/143 |
| 2011/0157276 A1* | 6/2011 | Zhao et al. | 428/172 |
| 2011/0157277 A1* | 6/2011 | Zhao et al. | 428/172 |
| 2011/0157278 A1* | 6/2011 | Gulvin et al. | 347/45 |
| 2011/0287217 A1* | 11/2011 | Mazumder et al. | 428/141 |
| 2012/0126449 A1* | 5/2012 | Hart et al. | 264/220 |

FOREIGN PATENT DOCUMENTS

| | | | | |
|---|---|---|---|---|
| WO | WO 2010-022107 A2 | | 2/2010 | |
| WO | WO 2010022107 A2 | * | 2/2010 | ......... B81C 1/00206 |

OTHER PUBLICATIONS

C. Berendsen; M. Skeren; D. Najdek; F. Cerny; "Superhydrophobic surface structures in thermoplastic polymers by interference lithography and thermal imprinting". Applied Surface Science (2009), 255, p. 9305-9310.*

[NPL-1] "Silica—Silicon Dioxide (SiO2)". AZOM (Oct. 12, 2012); <http://www.azom.com/properties.aspx?ArticleID=1114>.*

[1] S. Kim, E. Cheung, M. Sitti; "Wet Self-Cleaning of Biologically Inspired Elastomer Mushroom Shaped Microfibrillar Adhesives". Langmuir (2009), 25(13), p. 7196-7199.*

[2] Y. Zhang, C. Lo, J. Taylor, S. Yang; "Replica Molding of High-Aspect-Ratio Polymeric Nanopillar Arrays with High Fidelity". Langmuir (2006), 22(20), p. 8595-8601.*

[3] K. Lee, S. Lyu, S. Lee, Y. Kim, W. Hwang; "Characteristics and self-cleaning effect of the transparent super-hydrophobic film having nanofiber array structures". Appl. Surf. Sci. (2010), 256, p. 6729-6735.*

Ahuja, A. et al., "Nanonails: A Simple Geometrical Approach to Electrically Tunable Superlyophobic Surfaces," *Langmuir*, 2008, pp. 9-14, vol. 24.

Berendsen, C.W.J. et al., "Superhydrophobic surface structures in thermoplastic polymers by interference lithography and thermal imprinting," *Applied Surface Science*, 2009, pp. 9305-9310, vol. 255.

Hsu, S-H. et al., "Artificial Hairy Surfaces with a Nearly Perfect Hydrophobic Response," *Langmuir*, 2010, pp. 1504-1506, vol. 26, No. 3.

Im, M. et al., "A robust superhydrophobic and superoleophobic surface with inverse-trapezoidal microstructures on a large transparent flexible substrate," *Soft Matter*, 2010, pp. 1401-1401, vol. 6.

Leng, B. et al., "Superoleophobic Cotton Textiles," *Langmuir*, 2009, pp. 2456-2460, vol. 25.

Li, H. et al., "Super-"Amphiphobic" Aligned Carbon Nanotube Films," *Angew. Chem. Int. Ed.*, 2001, pp. 1743-1746, vol. 40, No. 9.

Manoudis, P.N. et al., "Superhydrophobic Composite Films Produced on Various Substrates," *Langmuir*, 2008, pp. 11225-11232, vol. 24.

Ming, W. et al., "Toward Superlyophobic Surfaces," *Contact Angle, Wettability and Adhesion*, 2009, pp. 191-205, vol. 6.

Roach, P. et al., "Progress in superhydrophobic surface development," *Soft Matter*, 2008, pp. 224-240, vol. 4.

Tuteja, A. et al., "Designing Superoleophobic Surfaces," *Science*, 2007, pp. 1618-1622, vol. 318.

Wu, T. et al., "Design and Microfabrication of High Performance Super-Lyophobic Surfaces," *13th International Conference on Miniaturized Systems for Chemistry and Life Sciences*, Nov. 1-5, 2009, pp. 773-775, Jeju, Korea.

Xie, Q. et al., "Facile Creation of a Super-Amphiphobic Coating Surface with Bionic Microstructure," *Advanced Materials*, Feb. 17, 2004, pp. 302-305, vol. 16, No. 4.

Yabu, H. et al., "Single-Step Fabrication of Transparent Superhydrophobic Porous Polymer Films," *Chem. Mater.*, 2005, pp. 5231-5234, vol. 17.

Yu, M. et al., "Superhydrophobic cotton fabric coating based on a complex layer of silica nanoparticles and perfluorooctylated quaternary ammonium silane coupling agent," *Applied Surface Science*, 2007, pp. 3669-3673, vol. 253.

* cited by examiner

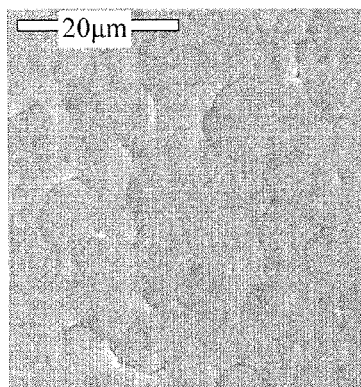 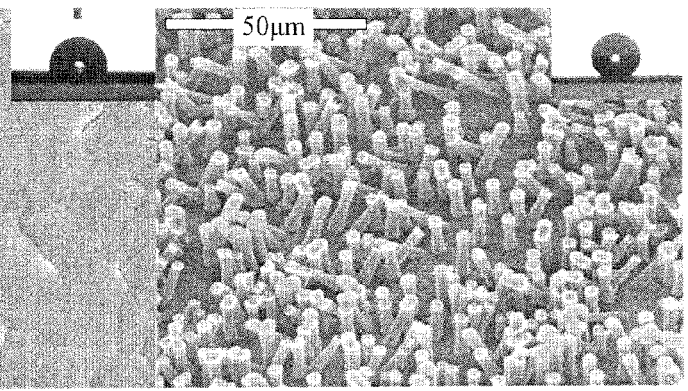
FIG. 12A   FIG. 12B
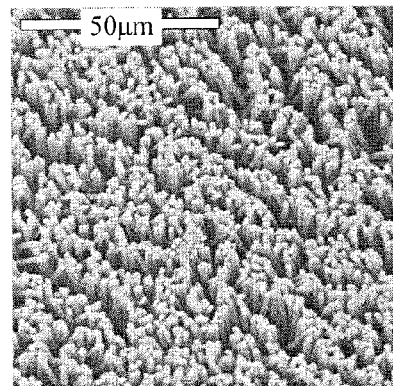 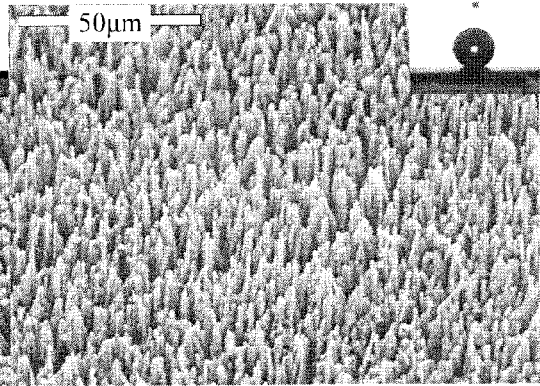
FIG. 12C   FIG. 12D

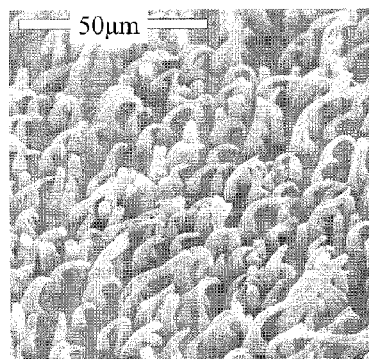 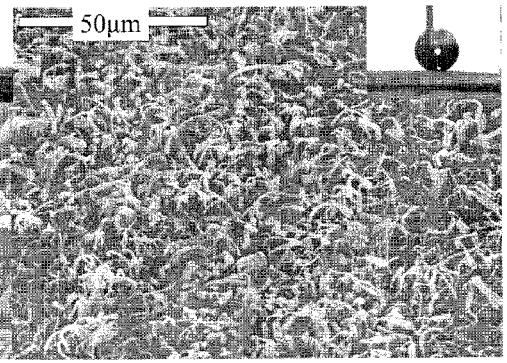
FIG. 13A  FIG. 13B
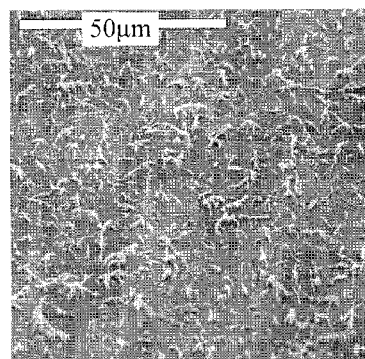 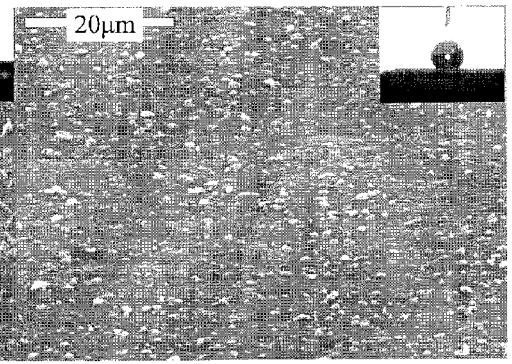
FIG. 13C  FIG. 13D
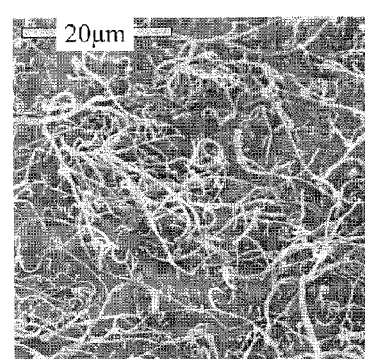 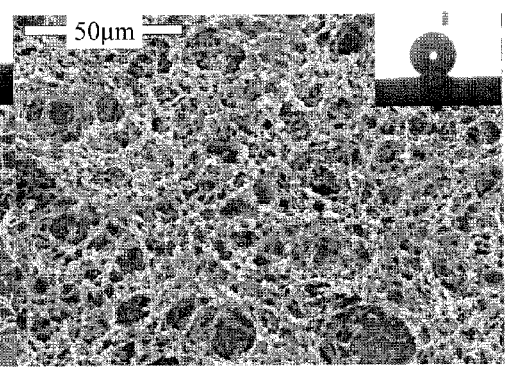
FIG. 13E  FIG. 13F

ARTICLES HAVING SUPERHYDROPHOBIC AND OLEOPHOBIC SURFACES

CROSS-REFERENCE TO RELATED APPLICATIONS

This application is the U.S. national stage application of International Patent Application No. PCT/US2011/059790, filed Nov. 8, 2011, which claims the benefit of U.S. Provisional Application Ser. No. 61/411,246, filed Nov. 8, 2010, the disclosures of which are hereby incorporated by reference herein in their entireties, including any figures, tables, or drawings.

BACKGROUND OF INVENTION

Considerable effort has been made towards the formation of superhydrophobic surfaces because of their potential applications, such as anti-sticking, anti-contamination, and self-cleaning coatings. A superhydrophobic surface is a textured surface that has a water contact angle that is larger than 150° and a low sliding angle, which is the critical angle where a water droplet of a defined mass rolls off the inclined surface. Few efforts have been made towards formation of superoleophobic, or superlyophobic, or even oleophobic surfaces, which display contact angles greater than 90° but less than 150°. Superoleophobic surfaces are also superhydrophobic, and the condition of being superoleophobic allows a superhydrophobic surface to be used for extended periods of time in real-world conditions, such that the superhydrophobic surface maintains its self-cleaning property without oily material accumulation on the surface that can eventually fill the textures, leading to the surface's loss of the superhydrophobic and self-cleaning properties.

Oil repellent surfaces are an engineering challenge because the surface tensions of oily liquids are usually in the range of 20-30 mN/m. The essential criterion, for having a surface with superoleophobicity, is to maintain the oil drops in a Cassie-Baxter (CB) state where vapor pockets are trapped underneath the liquid, which gives a composite surface. The CB state is dependent on the surface's structure and the surface energy of the material. If the structure and surface area are insufficient, the meta-stable energetic state is transformed into Wenzel state.

Superoleophobic surfaces display geometric features having a re-entrant structure, such as mushroom heads, micro-hoodoos, or horizontally aligned cylindrical rods to allow repellency of common hydrocarbon based liquids and oils. The re-entrant structure implies that a line drawn vertically, from the base solid surface through the geometric feature, must proceed through more than one solid interface of that feature. An example of a surface with features defining a re-entrant structure is shown in FIG. 1, where $\theta_c > \phi$ is a condition with the interfacial force directed upward, which inhibits the liquid from flowing downward, allowing the possibility of a CB state.

Superoleophobic surfaces require a surface of sufficiently low surface energy relative to the surface energy of oil. The threshold value of the equilibrium contact angle ($\theta_{trans}$) for these surfaces can be calculated by combining the Wenzel and CB equations in the form:

$$\cos \theta_{trans} = (f_s - 1)/(R_f - f_s)$$

where $R_f$ and $f_s$ are the surface roughness factor and fraction of liquid/solid contact area. When $R_f > 1 > f_s$, $\cos \theta_{trans} < 0$, the value of the transition contact angle is larger than 90°. This implies that a liquid with surface contact angle smaller than 90° cannot have CB state on that surface. Using Young's equation, the contact angle ($\theta_c$) is determined by:

$$\cos \theta_c = (\gamma_{SV} - \gamma_{SL})/\gamma_{LV}$$

where $\gamma_{SV}$, $\gamma_{SL}$, and $\gamma_{LV}$ are the surface tensions solid/vapor, solid/liquid and liquid/vapor, respectively. For a contact angle of 90°, $\gamma_{SV}$ and $\gamma_{SL}$ are equal; and $\gamma_{SL}$ is approximated as:

$$\gamma_{SL} = \gamma_{SV} + \gamma_{LV} - 2(\gamma_{SV}\gamma_{LV})^{1/2}.$$

The required surface tension of the superoleophobic solid surface is approximately:

$$\gamma_{SV} = \gamma_{LV}/4.$$

Therefore, to establish a CB state when using a low surface tension liquid, such as octane (21.6 mN/m), the substrates surface tension must be at the range of a few mN/m. Therefore, for oleophobic or superoleophobic surfaces, a fluorocarbon material is required at the surface to sufficiently decrease the surface energy of the structured material.

State of the art superoleophobic surfaces generally lack the ability to be fabricated as a structure in a manner that allows a broad commercial utility, as the techniques used to generate the needed texture are inherently complicated or otherwise disadvantageous with respect to use as a structural component under ambient conditions. For example: Ahuja et al. "Nanonails: A Simple Geometrical Approach to Electrically Tunable Superlyophobic Surfaces" *Langmuir* 2008, 24, 9-14 and Wu et al. "Design and Microfabrication of High Performance Super-Lyophobic Surfaces" 13th International Conference on Miniaturized Systems for Chemistry and Life Sciences Nov. 1-5, 2009, Jeju, Korea teach plasma or reactive-ion etching of silicon that has a patterned overhang geometry and conformally coated with a fluoropolymer; Leng et al. "Superoleophobic Cotton Textiles" *Langmuir* 2009, 25, 2456-2460 teaches the formation of silica on cotton cloth by an in situ Stöber Reaction followed by adsorption of silica nanoparticles and treatment with 1H,1H, 2H,2H-perfluorodecyltrichlorosilane; Ming et al. "Toward Superlyophobic Surfaces" *Contact Angle, Wettability and Adhesion,* 2009, 6, 191-205 teaches the formation of raspberry like particles embedding of spherical silica microparticles in a partially cured epoxy resin in a manner that about 40% of the sphere is within the resin and depositing a layer of silica nanoparticles on the microspheres followed by treatment with $SiCl_4$ and 1H,1H,2H,2H-perfluorodecyltrichlorosilane; Tuteja et al. "Designing Superoleophobic Surfaces" *Science* 2007, 318, 1618-1622 teaches microspinning microfibers onto a surface with a frilly 1H,1H,2H,2H-heptadecafluorodecyl substituted polyhedral oligomeric silsesquioxane ($R^fPOSS$)/polymethylmethacrylate (PMMA), which phase separation of the $R^fPOSS$ occurs during microspinning to form a superoleophobic surface when the $R^fPOSS$ portion exceeds about 10%; and Xie et al. "Facile Creation of A Super-Amphiphobic Coating Surface with Bionic Microstructure" *Adv. Mater.* 2004, 16, 302-305 teaches the deposition of a 5% PMMA/perfluorocarbon end-capped polyurethane FPU solution in dimethylformamide (DMF) on a glass substrate as a rough micro-nano binary structure of micro-papilla of PMMA covered by a rough conformal coating of the FPU due to microphase separation during the slow ambient air evaporation of the DMF from the solution. Hence, an article having an oleophobic superhydrophobic surface, which can be prepared by an easily performed method, is needed for the development of useful articles requiring superhydrophobic surfaces that are sufficiently robust for use in the ambient environment.

BRIEF SUMMARY

Embodiments of the invention are directed to superhydrophobic and oleophobic thermoplastic articles comprising a thermoplastic having at least one surface with re-entrant structures of the thermoplastic extending from the base of the surface and having a conformal coating comprising a perfluoroalkane covering at least the top, or distal, portion of the re-entrant structures. Embodiments of the invention are directed to methods of preparing the re-entrant structures on the surface of the thermoplastic articles by using a mold having voids and subsequently coating the re-entrant structures with a conformal perfluoroalkane comprising layer. In one exemplary embodiment of the invention, a porous thermoplastic membrane is used as a mold for another immiscible thermoplastic that has a lower temperature where flow can be induced, such that the pores of the membranes are at least partially filled upon contacting a heated mold with the thermoplastic article for a sufficient period of time when a sufficient pressure is imposed upon the interface of the mold and thermoplastic article. Upon removal of the mold from the thermoplastic article, a plasma deposition is used to coat the molded surface with a perfluoroalkane comprising coating.

Embodiments of the invention are directed to articles comprising at least one surface with re-entrant structures, where nanoparticles having one or more re-entrant structures are adhered or mechanically locked to the surface of an article. Embodiments of the invention are directed to methods of preparing the re-entrant structures on the surface of the articles by deposition of a suspension of microparticles or nanoparticles having re-entrant structures on the surface. The suspension can include a dissolved or suspended resin, which can be a plastic material in a volatile liquid vehicle or the resin can be deposited in a step before or after deposition of the microparticles or nanoparticles. After deposition, the resin or plastic material adheres or mechanically locks the microparticles or nanoparticles to the article surface. A portion of the microparticles or nanoparticles having at least one re-entrant structure is exposed with re-entrant structures extended from the article's surface. The microparticles or nanoparticles can comprise a perfluorocarbon or have a perfluorocarbon surface prior to their deposition, or the surface of the article can be deposited with a perfluoroalkane comprising coating, for example, by a plasma deposition.

BRIEF DESCRIPTION OF DRAWINGS

FIG. 12 shows SEM images that display surface morphologies and sessile water drop images for an unmolded PP article (a) and PC membrane molded PP articles using membranes with 3.0 µm (b), 1.2 µm (c), and 0.6 µm (d) pores.

FIG. 13 shows SEM images of delaminated surfaces of molded PP articles and their sessile water drop images where: the PC membrane used as the mold have pore sizes of (a) 3.0 µm (b) 1.2 µm and (c) 0.6 µm; 0.6 µm-PC membrane molded surfaces at lower, 170° C., (d) and higher, 200° C., and (e) temperatures; and a prior-art porous coating from a Si substrate dip-coated with i-PP solution followed by evaporation (f).

DETAILED DISCLOSURE

Figure 1:
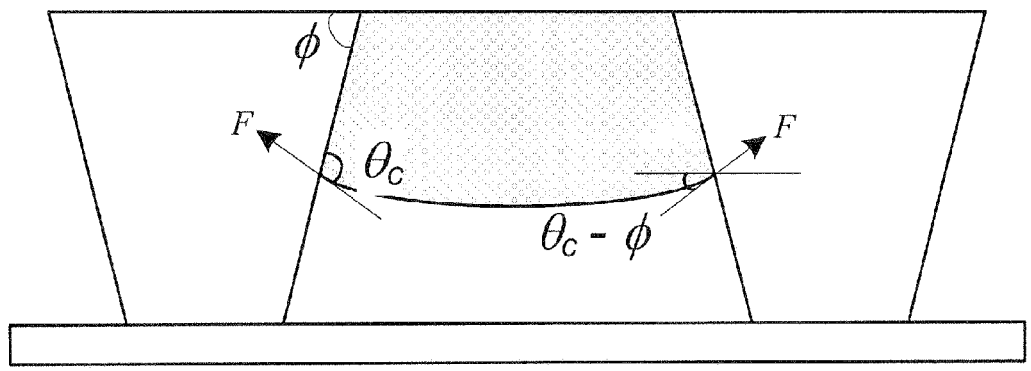
FIG. 1 is a schematic diagram of interfacial force on a re-entrant structure, resulting in a contact angle $\theta_c$.

Embodiments of the invention are directed to a thermoplastic article having a superhydrophobic and oleophobic surface with re-entrant structures of the thermoplastic extending from a supporting thermoplastic base surface, wherein the re-entrant structure's surface has been modified with a perfluorocarbon. In one embodiment of the invention the re-entrant structures are micro-fibers or nano-fibers where the fibers are non-perpendicularly oriented over a portion of the fiber's length from the article's sub-surface. Other embodiments of the invention are directed to the fabrication of the thermoplastic article having a superhydrophobic and oleophobic surface. The fabrication methods allow articles other than flat sheets with surfaces that are oleophobic and superhydrophobic to be formed, including articles that have large dimensions.

In an embodiment of the invention, the base article has a superhydrophobic surface, which comprises any thermoplastic that can flow under pressure at an elevated temperature without decomposition. This flow may be of the melt or may be a cold flow at a temperature below the melting temperature. In an embodiment of the invention, the re-entrant structure comprising surface of the article is formed by being forced against a surface of a mold, which is a material that does not undergo distortion at the temperature where the thermoplastic can flow. The mold allows the flow of the thermoplastic into voids in the mold that act as templates for the re-entrant structures. In addition to the re-entrant structures, the voids can have shapes that form bumps or other support features, which may or may not act as re-entrant structures, and can promote superhydrophobic properties but not oleophobic properties when these bumps are not re-entrant structures. Re-entrant structures can be independent of the bumps, or may extend from the bumps. The temperature of molding can be any temperature in excess of the temperature at which the article is ultimately used, and the pressure can be supplied in any manner including use of a mechanical press, a hydraulic press, a gas pressure, or positioning of a weight, as is appropriate for the thermoplastic material and shape of the thermoplastic article and where the pressure is imposed from the article side, mold side or both. The re-entrant structure remains attached to the article after separation of the article from the mold. The voids in the molds can be formed in any manner where the voids are of a structure having at least one dimension that is about 100 nm to about 5 μm. This dimension of the voids of the mold allows formation of the complementary re-entrant structure's surface that is normal to any water or oil comprising liquids placed upon the article. For example, in an embodiment of the invention, the re-entrant structure can be a fiber whose non-end surface is parallel to the structure from which it extends at one or more points along the length of the fiber. Thermoplastics that can be used for preparation of the base article include, but are not limited to, polypropylene, polyethylene, polystyrene, polymethylmethacrylate, nylon, polyethylene terephthalate, polybutylene terephthalate, and polycaprolactone.

In another embodiment of the invention, the re-entrant structures can comprise a thermoplastic or a duroplastic, as the entire article or as a coating on an article that comprises the outer surface of the article and the re-entrant structures. In this embodiment of the invention, the coating and re-entrant structures can be formed by pulling fibers from a thin layer of polymerizable liquid from the surface of the coating on the article; wherein the fibers are pulled using a needle bed. In this manner, coated metal, ceramic, or plastic articles, either thermoplastic or duroplastic, can have fibers or other re-entrant structures generated on the articles. Polymerization can occur by a thermally activated mechanism or a photochemically activated mechanism. Among thermally activated mechanisms, polymerization can result from step-growth or from chain-growth mechanisms. The coating may include a thermal initiator, photoinitiator, or a catalyst to start or accelerate the polymerization under a desired condition of temperature and light exposure.

According to embodiments of the invention, the mold can be separated from the base thermoplastic article by a variety of methods. For example, in one embodiment the mold is delaminated, or pealed, from the base article. The mold can be a second thermoplastic that is immiscible with the thermoplastic from which the base article is formed. In other embodiments of the invention, the mold can be a glass, a ceramic, a metal, or any other material where a flowable thermoplastic can be pressed against to fill the voids of the mold with the flowing thermoplastic. Even when the base article is not a flat sheet, the mold can be designed as a single unit or as multiple sections combined in concert to allow the pressing of the base thermoplastic article against the mold. In this manner, the thermoplastic base article can be formed in any shape where a melt is molded. Depending on the thermoplastic used, the article may be superhydrophobic but not oleophobic, or it can be neither superhydrophobic nor oleophobic, due to the value of the thermoplastics surface energy. Although the base article can be both superhydrophobic and oleophobic, in most embodiments of the invention, the thermoplastic is a common thermoplastic chosen for its bulk material properties and not for its inherent surface properties, as, according to embodiments of the invention, only one or more surfaces are conformally coated to be oleophobic. In this manner, the bulk properties and the low material costs of the bulk article are decoupled from the surface properties and the higher material costs per mass of the conformal coating.

In another embodiment of the invention, the thermoplastic base article can be separated from the mold by dissolution of the mold, where the mold is prepared from a material that is soluble in a non-solvent of the thermoplastic that comprises the base article. In this manner, a surface with a shape that is not amenable to delamination from the mold can be formed. In this manner, baffles and other high surface area thermoplastic superhydrophobic articles can be formed.

According to embodiments of the invention, the thermoplastic base article can be rendered lyophobic or superlyophobic as well as superhydrophobic by applying a conformal coating of a fluorocarbon. The conformal coating can be carried out by any method that allows deposition of a fluorocarbon coating over the surface of the re-entrant structure that is exposed to a liquid. The fluorocarbon covers the entire surface but does not fill the space surrounding the portions of the re-entrant structure. The coating can be a formed by: plasma deposition of a fluorocarbon, for example, octafluorocyclobutane, hexafluoroethane, tetrafluoromethane or any other fluorinated hydrocarbon; deposition from solution, where the fluorocarbon is functionalized in a manner allowing reaction with one or more functional groups on the surface of the thermoplastic, for example a 1H,1H,2H,2H-perfluoroalkylchlorosilane, such as 1H,1H,2H,2H-heptadecafluorodecylchlorosilane, where the silane has 1 to 3 chloro groups and may have 1 or 2 methyl groups, or any other surface functionalizing fluorocarbon.

In another embodiment of the invention, the superhydrophobic and oleophobic article comprises a re-entrant structure that is not an extended portion of the base article, but is attached to the base article, where the re-entrant structure comprises a perfluoroalkane or has a perfluoroalkane covering at least to the portion of the re-entrant structure that is distal to the base article. The base article, or substrate, has a coating that adheres or mechanically locks the re-entrant structure to the surface of the base article. The re-entrant structure can be a portion of a microparticle or a nanoparticle that is attached to the base article by an adhesive resin or is mechanically fixed to the surface of the base article by a resin. The resin can be a cross-linked resin, for example, but not limited to, an epoxy resin or urethane resin, or a non-cross-linked material, for example, but not limited to, a thermoplastic on the base article.

The base article can be of any material and the re-entrant structure can be of any material that has a perfluoroalkane surface or upon which a perfluoroalkane conformal coating can be applied. For example, the base article can be a metal, a polymer, a glass, a ceramic, or a natural material, for example, wood. The re-entrant structure is a portion of a microparticle or nanoparticle that has one or more portions capable of extending into space upon deposition of the microparticle or nanoparticle on a surface. The microparticles or nanoparticles can be, for example, a thermoplastic or thermosetting polymer that provides a flexible re-entrant structure. The re-entrant structure can comprise at least one flexible fiber or its equivalent, having, for example, a ratio of elastic modulus to aspect ratio of about 1 to about 20 MPa, which permits the flexible fibers to bend on contact with a surface of a liquid droplet rather than penetrating into the liquid. Portions of the fiber can be connected to form loops or a single fiber can form spiral structures.

Figure 2:
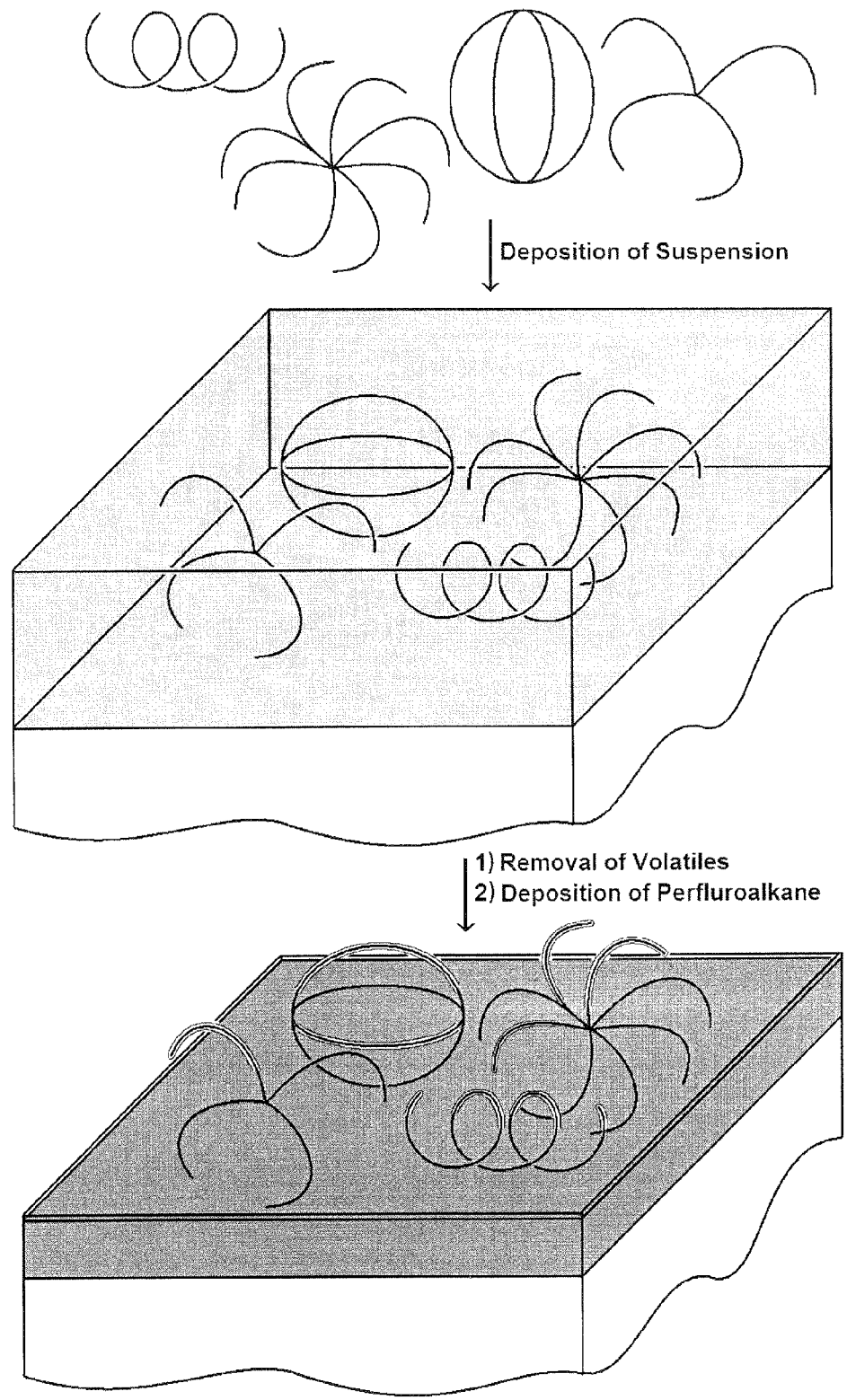
FIG. 2 is a drawing of a variety of microparticles or nanoparticles having geometries that can be deposited on a substrate's surface in a fluid and rendered fixed to the surface by removal of a volatile portion of the fluid to leave a resin that adheres or mechanically fixes the microparticles or nanoparticles to the substrate surface and covered with a conformational coating comprising a perfluoroalkane to render the surface superhydrophobic and oleophobic, according to an embodiment of the invention.

FIG. 2 illustrates some, but not all, geometric shapes for microparticles or nanoparticles that can be: dispersed in a fluid; deposited on a substrate surface; fixed to the substrate surface; and the suspending volatiles removed to leave a surface of microparticles or nanoparticles that are mechanically fixed or adhered to the substrate in a manner where a flexible portion of the microparticle or nanoparticle is obliged to extend from the surface as a re-entrant structure. Alternatively the fluid can be a polymerizable monomer or oligomer that forms a thermoplastic or thermoset upon heating or irradiating, and the deposition of the microparticles or nanoparticles and the adhering or mechanically fixing resin occurs in two steps, where the deposition of the microparticles or nanoparticles can, but does not necessarily require a suspending volatile liquid. The microparticles or nanoparticles can combine any features illustrated in FIG. 2, for example, a fiber can be fused to a loop, a spiral fiber can have attached positions to include one or more connected loops, or a loop can have one or more fibers radiating from the loop. FIG. 2 does not illustrate a necessary relative population density of microparticles or nanoparticles, nor is FIG. 2 intended to reflect the relative thickness of a layer of resin necessary to adhere or fix the microparticles or nanoparticles relative to the dimensions of the remaining re-entrant structure from the microparticles or nanoparticles. Fibers that constitute the microparticles or nanoparticles, including the re-entrant structures, can have a regularly curving structure or the fiber can have a bend, where an abrupt change of direction occurs, for example, at an angle of 90, 60, or 45 degrees. For example, loops can have the form of rectangles, triangles or any regular or irregular polygon.

In an embodiment of the invention, as shown in FIG. 2, the microparticle or nanoparticle comprises fibers that contain a multiplicity of branches, which oblige at least one branch to extend from the surface upon deposition on a surface. Although microparticles or nanoparticles that comprise four or eight fibers radiating from a core are shown, the fibers may extend from a single core or be branched from multiple positions along a fiber as long as the microparticles or nanoparticles reside on a surface such that at least one branch is obliged to extend from the surface. The fibers are flexible, where the fiber flexes under the force of a suspended droplet, having a ratio of elastic modulus to aspect ratio of about 1 to about 20 MPa.

In an embodiment of the invention, the microparticle or nanoparticle comprises a plurality of loops where one loop can be attached to any other loop at one or two positions. FIG. 2 includes a microparticle or nanoparticle where two loops of fibers are attached at two positions on each loop. The microparticles or nanoparticles can comprise a mixture of different sized loops and different number of loops attached to each other such that at least one portion of at least one loop extents from the surface as the re-entrant structure. The loop comprises a fiber that will flex under the force of a suspended droplet.

In an embodiment of the invention, the microparticle or nanoparticle can be spherical or other ovoidal shapes. The ovoid can be hollow or the ovoids can be filled with a readily compressible core material such that it can flex under the mass of a liquid droplet in the manner of the flexible fibers. When the fibers have a bend, cubes, pyramids and other solid forms of microparticle or nanoparticle can exist. In an embodiment of the invention the cubes, pyramids and other solid forms can have a continuous surface between the vertices, but are hollow or filled with a readily compressible core material such that it can flex under the mass of a liquid droplet in the manner of the flexible fibers.

In an embodiment of the invention, the ovoidal microparticles or nanoparticles can be suspended in a resin that adheres the microparticles or nanoparticles to the substrate surface. When the ovoidal microparticles or nanoparticles are gas filled, for example, air filled, the microparticles or nanoparticles have a buoyancy that permits floating of the microparticles or nanoparticles to the top of the adhering resin. After curing of the resin, which may occur by the loss of a volatile component in the suspending fluid and/or polymerization of a fluid resin, the hollow spheres can be fractured mechanically, for example, abraded, by an externally provided force, or by heating the surface, such that the gas within the hollow microparticles or nanoparticles expands and explode, to form a plurality of irregular fractured features that are the re-entrant structures of the superhydrophobic and oleophobic surfaces, where the fractured features are a polymer, for example, a thermoplastic or thermosetting polymer, or other material that provides flexibility. Alternatively, the ovoidal microparticles or nanoparticles can be filled with a liquid or solid that, upon heating, vaporizes, sublimes, or decomposes to a form an expanding gas, which bursts the microparticles or nanoparticles and forms the fractured re-entrant structures. The liquid or solid filled microparticles or nanoparticles can be buoyant in the resin, or can become buoyant during the heating process.

In another embodiment of the invention, as included in FIG. 2, the fiber that comprises the microparticles and nanoparticles, can adopt effectively a spiral form, where spirals can be regular, non-regular, and can have defects. Screw diameters can be from about one to about 100 µm, for example, 10 to 20 µm. The spiral fiber has at least one full loop, such that a significant portion of the spiral can extend as the re-entrant structure from the surface. The spiral fibers can be broken fibers, including fibers that are less than a full loop, where the fibers, upon deposition on the surface, have a portion extending from the surface to a degree that permits flexing under the force of a suspended droplet. Again the ratio of elastic modulus to aspect ratio of the fiber extending from the surface is about 1 to about 20 MPa.

The superhydrophobic and oleophobic surfaces comprising the re-entrant structures are effective at resisting water and oils that are introduced to a surface having the re-entrant structures. The superhydrophobic and oleophobic surfaces display antifogging properties, where the condensation of water does not occur under normal circumstances, but when in extreme conditions, where condensation can occur, water forms beads that runs off a surface that is not planar, where deviation from planarity can be as little as about two degrees.

Methods and Materials

Commercial Porous Membrane as Molds

Figure 3A:
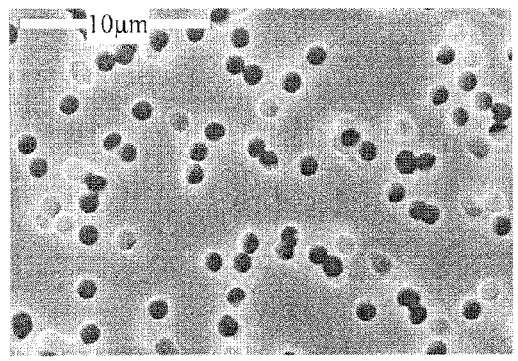
FIG. 3 shows SEM images of commercial membranes that have been examined as molds for the surfaces of the articles, according to embodiments of the invention, where (a) is a track-etched polycarbonate membranes and (b) is an anodic alumina membrane, where the size bars are 10 and 1 µm in length, respectively.
Figure 3B:
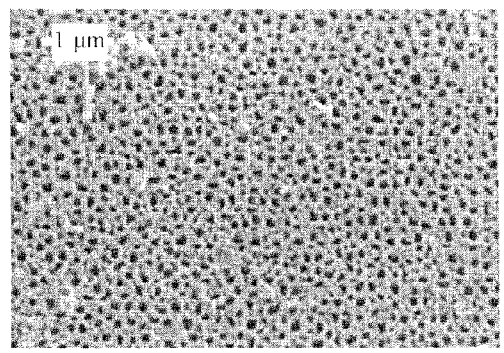

FIG. 3 shows SEM photos of: Anodic alumina membrane (Anopore®, Whatman), pore size: 0.2 µm, and Track-etched polycarbonate (PC) membrane (ISOPORE™, Millipore Inc), pore size=0.6, 1.2 and 3.0 µm Thermoplastics as Base Articles Table 1 Summary of Thermoplastics' Properties.

The PS (polystyrene) and PMMA (Polymethyl methacrylate) films were prepared by drying polymer solutions in which PS and PMMA granules were dissolved (at 15 wt %) in toluene and tetrahydrofuran (THF), respectively.

TABLE 1

Thermoplastic used for base articles and re-entrant structures

| Polymers | Surface Tension (20° C.) | | Sources |
|---|---|---|---|
| | $\gamma_{LV}$ (mN/m)[a] | $\theta_c$ (mN/m)[b] | |
| PP (Polyproplyene) | 29.4 | 28.6 | File jacket No. 85781, SMEAD co. |
| PVDF (Polyvinylidene fluoride) | — | 23.2 | Kynar ® sheet Westlake Chemical Inc. |
| LDPE (Low-density polyethylene) | 34.3 | 32.0 | HIS-070335-G-01 Small Parts Inc. |
| PET (Polyethylene terephthalate) | — | 46 | PES-19900-F-01 Small Parts Inc. |
| PS (Polystyrene) | 40.7 | 41.4 | Lab prepared |
| PMMA (Polymethyl methacrylate) | 41.1 | 35.9 | Lab prepared |

[a]Liquid surface tensions $\gamma_{LV}$ of solid polymers extrapolated from higher temperature studies of polymer melts.
[b]Zisman critical surface tension $\theta_c$ obtained from contact angle measurement of a series of liquids of surface tension.

Figure 4:
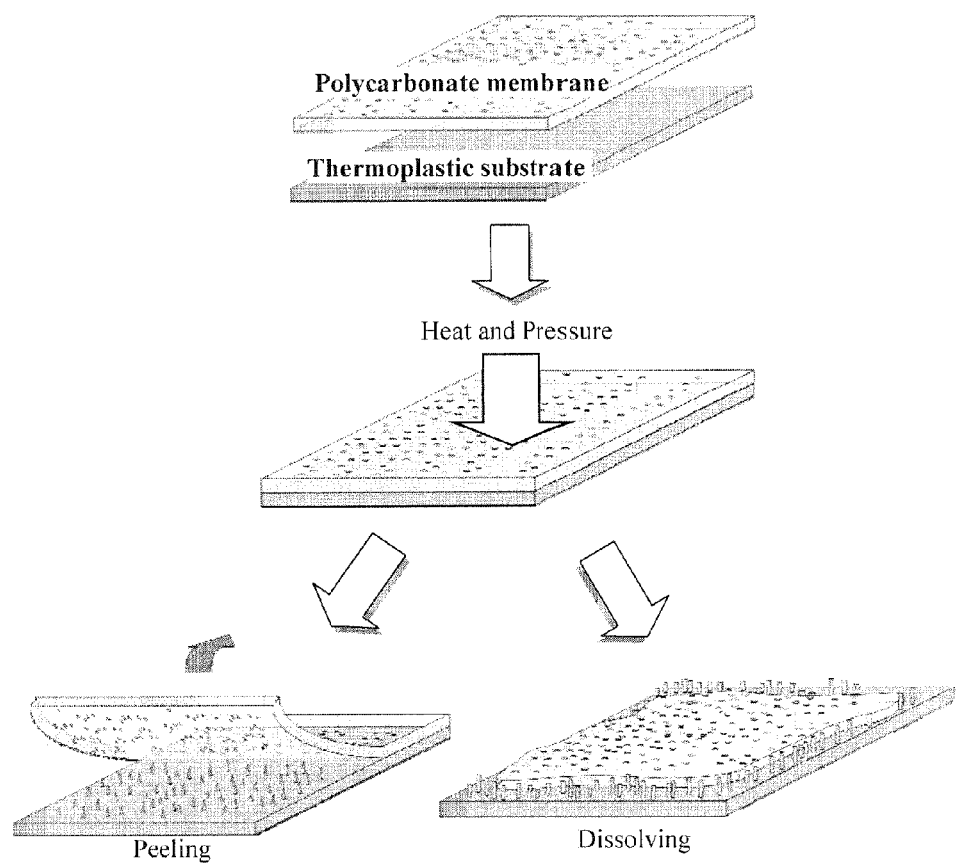
FIG. 4 is a schematic of the molding process, according to embodiments of the invention, where a polycarbonate membrane is used as the mold and removal of the mold is carried out by delamination (peeling) or dissolution of the membrane from the molded article.

Thermoplastic sheets were cut into 1.5 cm squares and sonicated in acetone and DI water for 5 minutes. The sheet was dried in air and a membrane mold was placed on the sheet and then sandwiched between two glass slides using binder clips to hold the assembly together. The assembly was then placed in a vacuum oven (vacuum pressure<1 kPa, VO914A, Lindberg/Blue M co.) at a desired temperature for 10 minutes. Alumina membranes were removed by dissolving in 45% KOH solution for 10 minutes while PC membrane was dissolved in dichloromethane ($CH_2Cl_2$) for 5 minutes. The PC membrane was peeled off by hand, to delaminate the membrane from thermoplastic sheets. FIG. 4 is a schematic representation for molding and removal of the thermoplastic from the membrane mold.

Polypropylene (PP) Base Articles

Figure 5A:
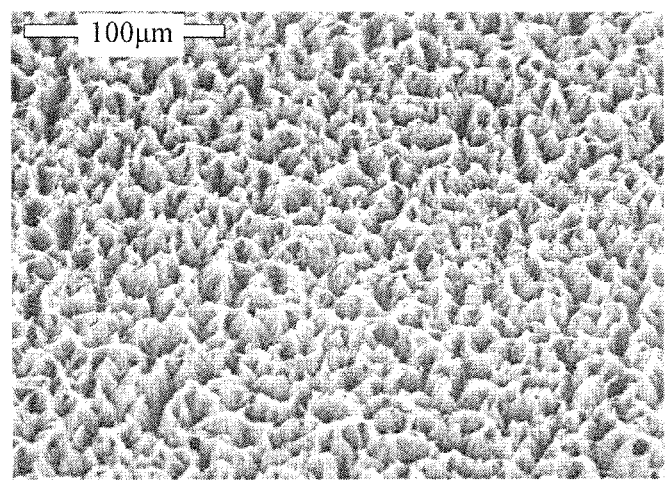
FIG. 5 is SEM images of the microstructure of a surface of an uncoated PP article where the surface was molded using an AAO membrane (φ=0.2 µm), according to an embodiment of the invention, where (a), (b) and (c) are different magnifications, with individual fibers clearly observable at the highest magnification.
Figure 5B:
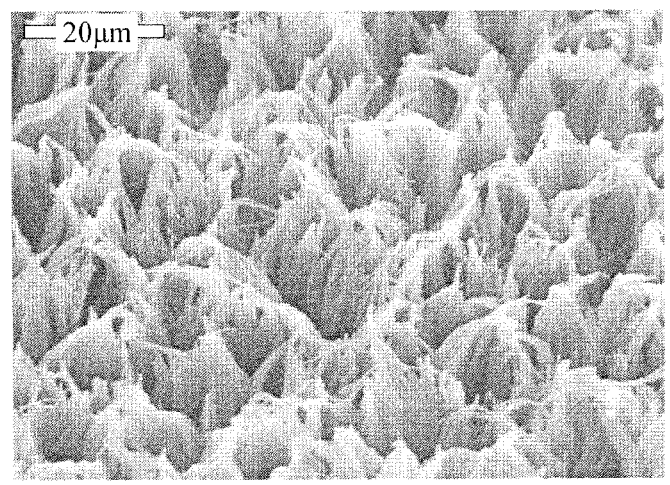
Figure 5C:
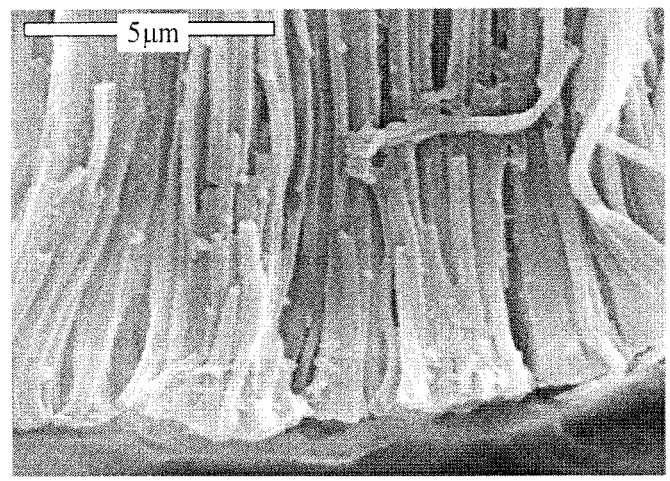

The PP used was from a general file jacket (No. 85781, SMEAD Co.), where differential scanning calorimetry (DSC) analysis determined a melting temperature of 165° C. The PP sheet from the jacket was pressed against an AAO membrane (µ=0.2 µm) at 190° C. for 10 minutes followed by dissolving the membrane in aqueous KOH. FIG. 5 shows the surface morphology after dissolving the membrane from different angles and magnification. The protruded structure formed a grass-like surface where hundreds of submicron-sized fibers clumped together and randomly curled along a vertical projection. The diameter of fibers is in good agreement with the pore size, and the high pore density of the pores in the membrane ($10^8$-$10^9$ $cm^{-2}$), the mean distance between pores is only about 50 nm promoting the aggregation of fibers rather than fibers residing as individual entities.

Figures 6A, 6B:
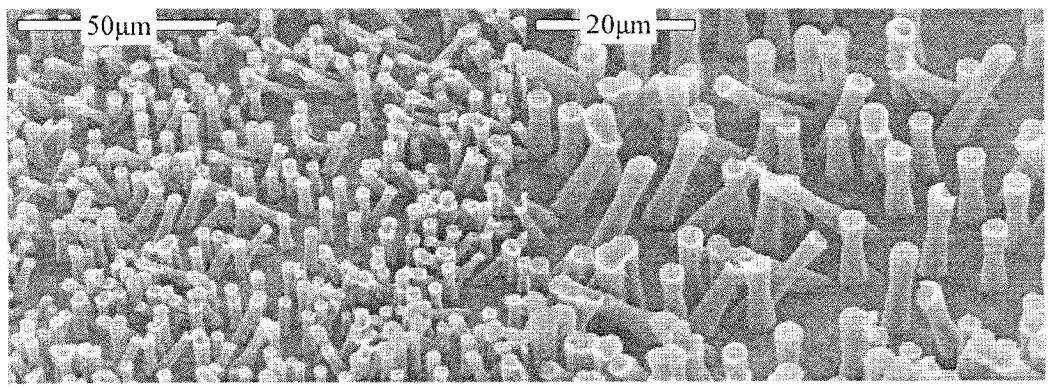
FIG. 6 shows SEM images at two different magnifications for surfaces of uncoated PP articles, according to embodiments of the invention, where: (a)-(d) are articles molded using PC membranes having pore sizes of φ=3.0 µm (a) and (b), φ=01.2 µm (c) and (d); and (e) and (f) where the membranes were dissolved after molding with φ=10.6 µm.
Figures 6C, 6D:
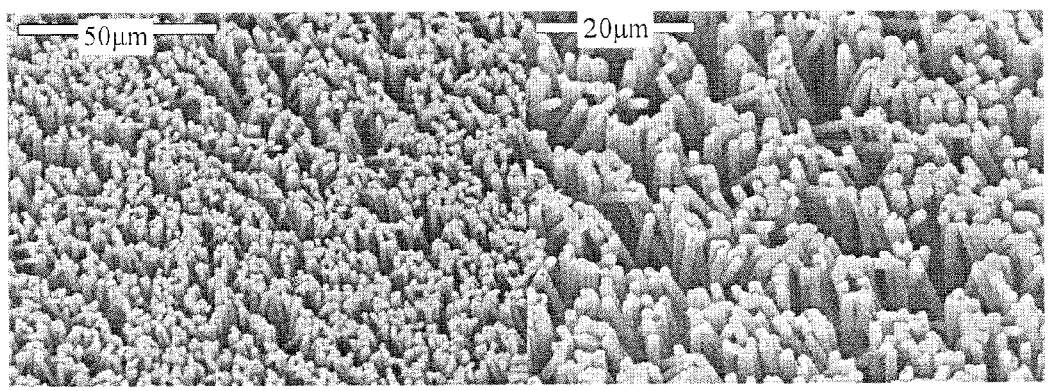
Figures 6E, 6F:
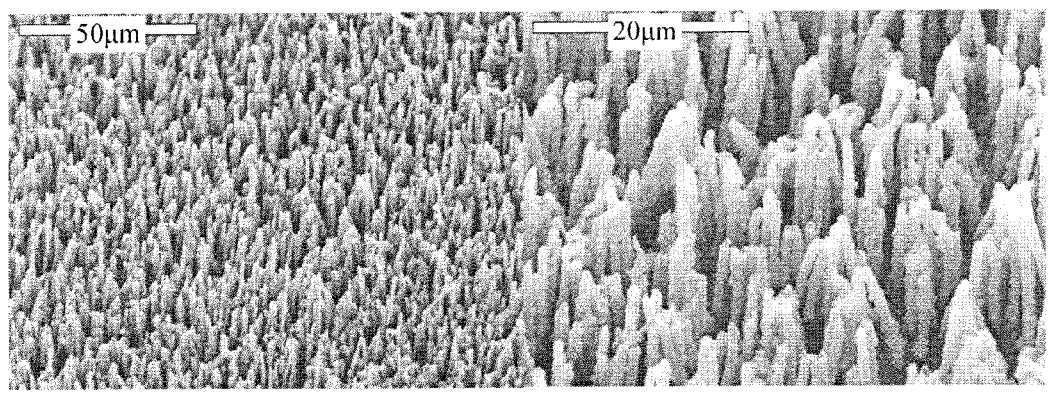

The PP was also molded with polycarbonate (PC) membranes (φ=0.6, 1.2 and 3.0 µm). The molded PP article was separated from the membrane mold by dissolving the membrane in dichloromethane to yield the surface structures shown in FIG. 6. For 3.0 and 1.2 µm molded surfaces, cylindrical posts protruded from the bulk article with an average height of about 20 µm with a disordered pore distribution on PC membrane where posts are not perpendicular to the surface as shown in FIG. 6b. Surface molded from the 0.6 µm membrane display height variations and some aggregation of fibers.

Figures 7A, 7B:
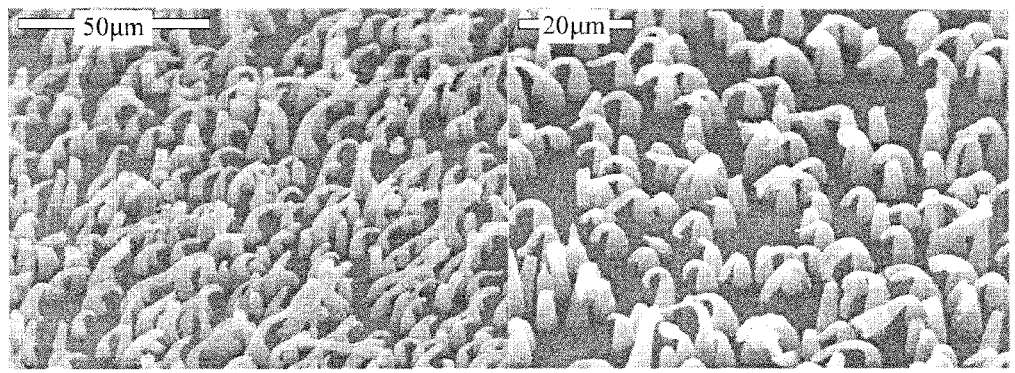
FIG. 7 shows SEM images at two different magnifications for surfaces of uncoated PP articles, according to embodiments of the invention, from articles molded using PC membranes having pore sizes of φ=3.0 µm (a) and (b), φ=1.2 µm (c) and (d), and φ=0.6 µm (e) and (f), where the membranes were delaminated after molding.
Figures 7C, 7D:
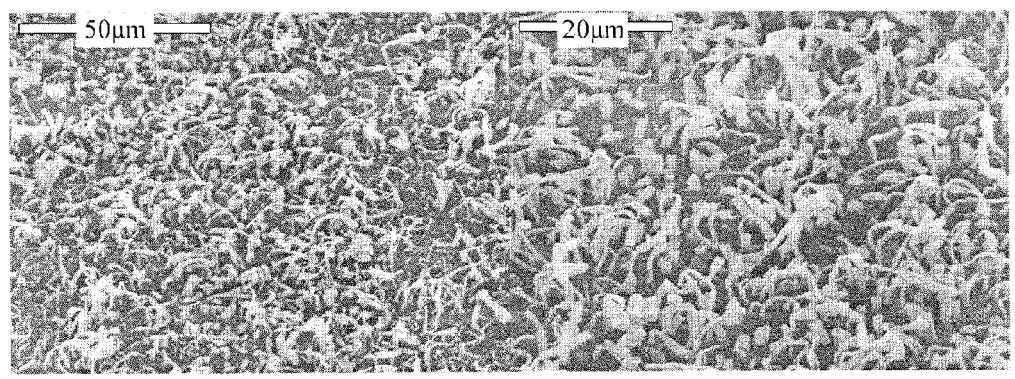
Figures 7, 7E:
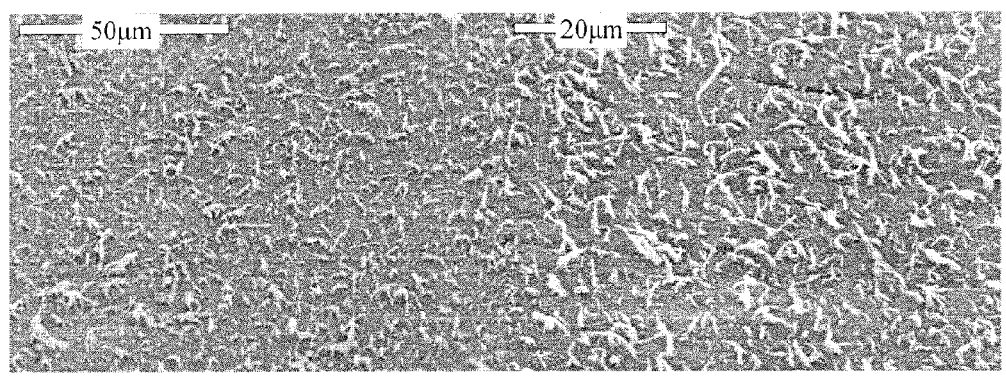
Figure 8A:
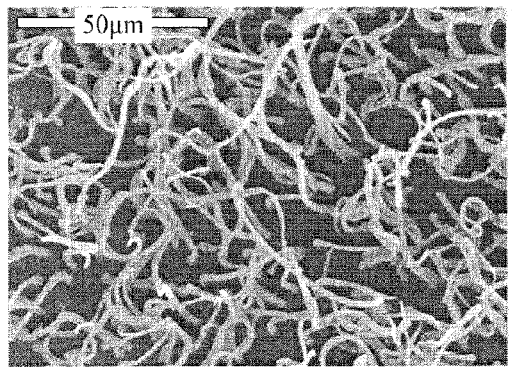
FIG. 8 shows SEM images at two different magnifications for surfaces of uncoated LDPE articles, according to embodiments of the invention, from articles molded using PC membranes having pore sizes of φ=3.0 µm (a) and (b), φ=1.2 µm (c) and (d), and φ=6 µm (e) and (0, where the membranes were delaminated after molding.
Figure 8B:
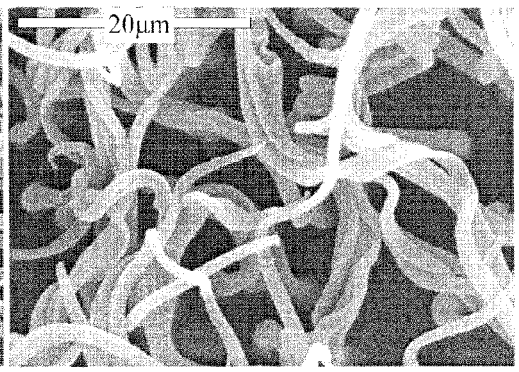
Figure 8C:
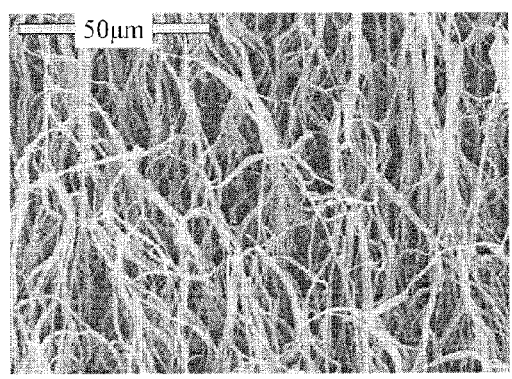
Figure 8D:
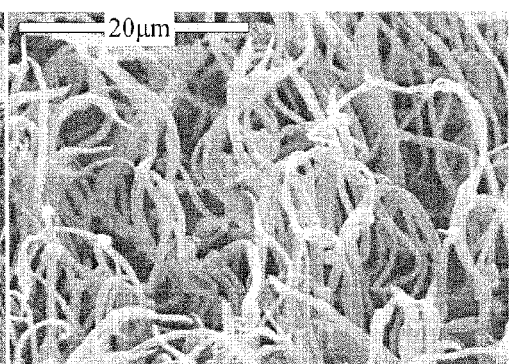
Figure 8E:
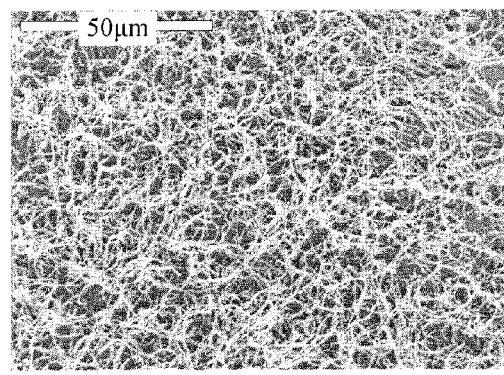
Figure 8F:
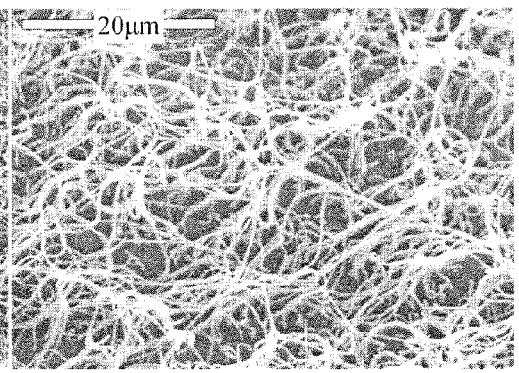

The PC membrane was also delaminated from the PP article by peeling the membrane from the article by hand. The morphology of the resulting article's surface depends on the pore size of the PC membrane as shown in FIG. 7. The fibers from 3.0 µm membranes are stretched with the tips aligned in the direction of membrane peeling. The fibers molded from 1.2 µm membranes are disordered with some fibers significantly elongated and randomly curled to fiber lengths of over 50 µm. Surfaces cast from delaminated 0.6 µm membranes differs dramatically from the surfaces formed after dissolving of the membrane mold, displaying a density of fibers almost two order of magnitude lower than the membrane's pore density of ~4×10$^7$ cm$^{-2}$. The surfaces delaminated from the 0.6 µm membrane, in addition to having a low packing density, show curled fibers of various randomly oriented lengths.

Low-Density Polyethylene (LDPE) Base Articles

LDPE surfaces were molded using PC membrane pressed together at 140° C. for 6 to 8 minutes followed by removing the membrane by delamination. Sheets of surface molded LDPE are opaque, rather than translucent as before molding. The SEM image, as shown in FIG. 8, displays elongated fibers of several hundred micrometers all over the surface that are randomly oriented and entangled with the fiber length dependent on the diameter of the pores of the membrane used as the mold.

Polyvinylidene Fluoride (PVDF) Base Articles

Figures 9A, 9B:
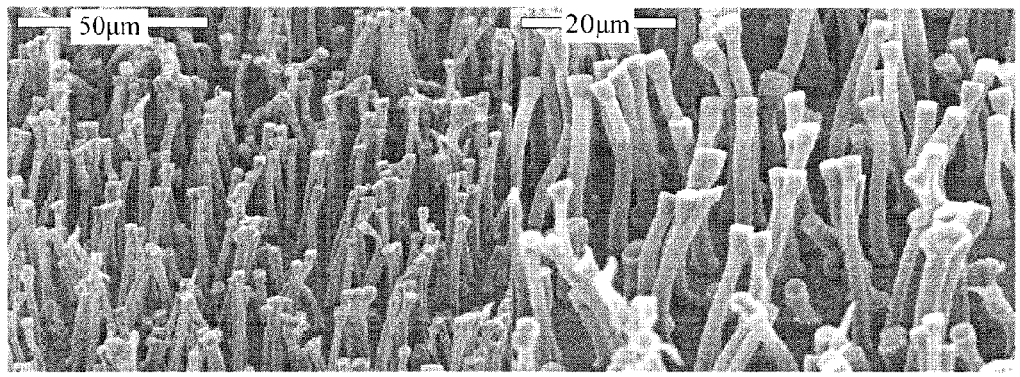
FIG. 9 shows SEM images at two different magnifications for the surfaces of uncoated PVDF articles, according to embodiments of the invention, from articles molded using PC membranes having pore sizes of φ=3.0 µm (a) and (b), φ=1.2 µm (c) and (d), and φ=0.6 µm (e) and (f) where the membranes were delaminated after molding.
Figures 9C, 9D:
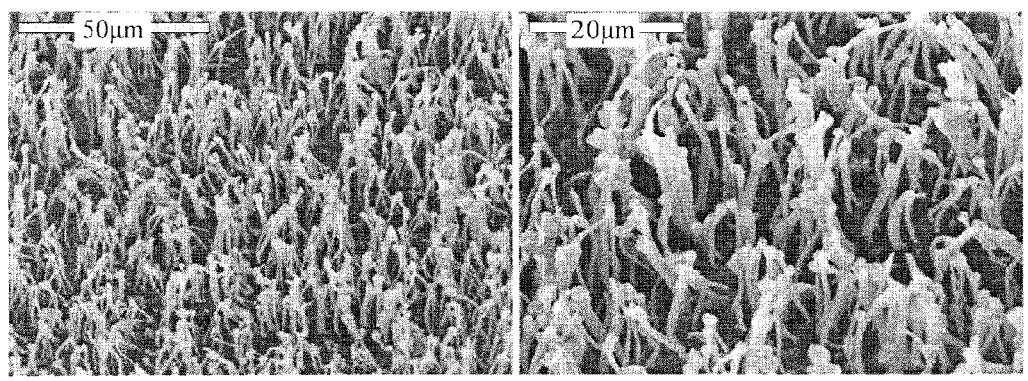
Figures 9E, 9F:
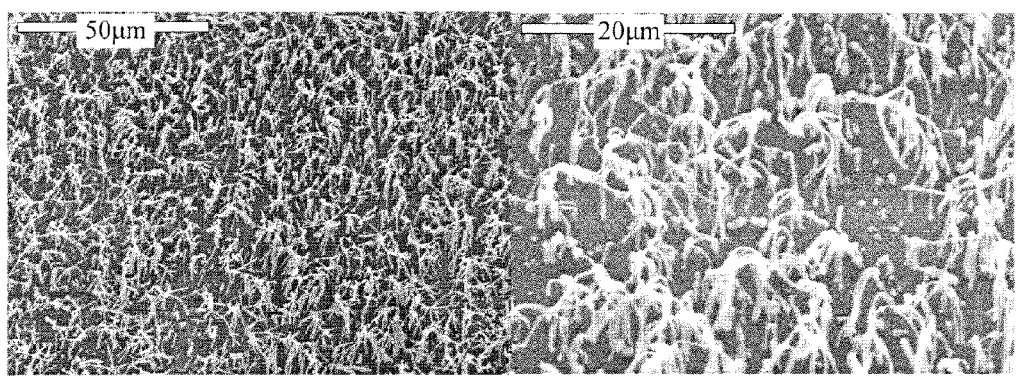

PVDF is a fluoropolymer having a melting point of about 168° C. PVDF was molded at 190° C. using PC membrane molds separated by hand delamination. The surface features from molded PVDF are shown in FIG. 9. Delamination from 3.0 µm membranes was difficult, as the article strongly adhered to the mold, and the images in FIG. 9 were from a very small portion of the article that did delaminate from the membrane near the edge of the PVDF sheet. The distal end of the fiber was larger than the remaining fiber. The surfaces formed upon delamination of the 1.2 µm membrane mold displayed an enlarged end and a greater degree of curling than that from the larger pore membrane. The surface delaminated from the 0.6 µm membrane showed elongated fibers that curled randomly with some fibers apparently sheared from the surface during delamination.

Other Thermoplastics Base Articles

Figures 10A, 10B:
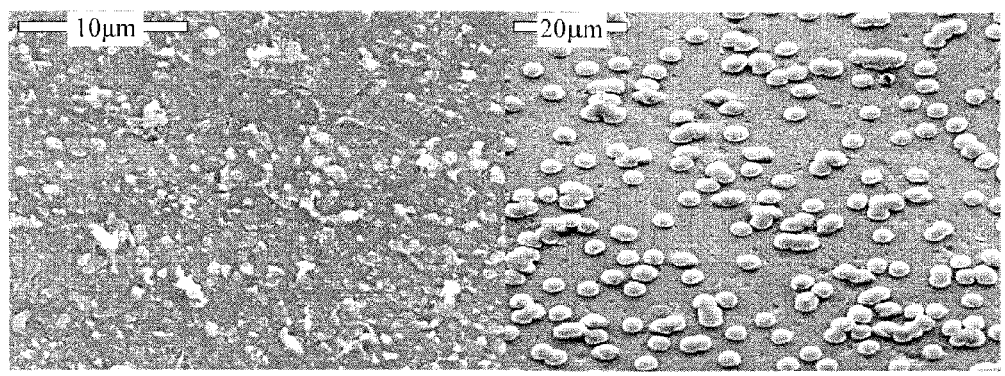
FIG. 10 shows SEM images at two different magnifications for the surfaces of uncoated PS articles, according to embodiments of the invention, molded using PC membranes having pore sizes of φ=0.6 µm (a) and φ=1.2 µm (b) and PMMA articles, according to embodiments of the invention, from articles molded using PC membranes having pore sizes of φ=0.6 µm (c) and 1.2 µm (d), where the membranes were delaminated after molding.
Figures 10C, 10D:
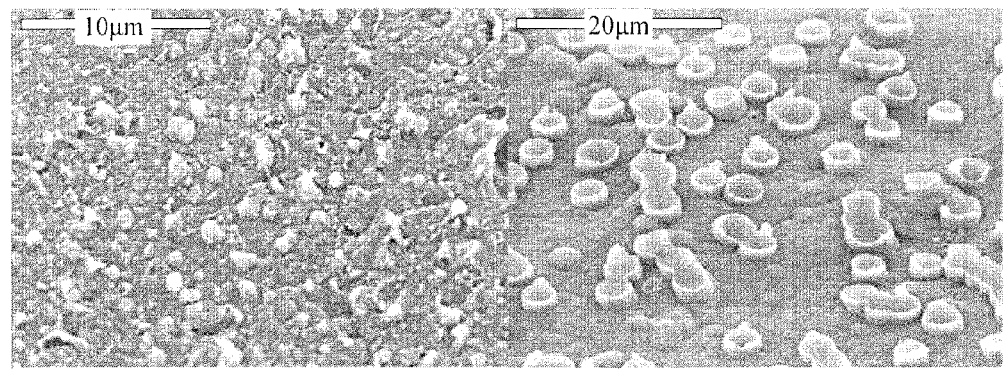

Polystyrene (PS) and polymethyl methacrylate (PMMA) films were cast from solution and dried in air. PS articles were molded at 200° C. and PMMA articles were molded at 160° C. and the membrane molds were removed by delamination. As shown in FIG. 10 significant formation of fibers by flow into the membrane molds did not occur with pore sizes of 1.2 µm or less and only short fibers formed using a 3.0 µm membrane under the conditions employed.

Static Contact Angle Measurement

All the contact angle measurements were carried out at ambient temperature (~23° C.) with a goniometer, Ramé-Hart Model 100, equipped with an automated dispensing system and a 30 gauge flat-tipped needle. The goniometer, consists of a CCD camera, light source and an automated syringe pump. Images were recorded using the goniometer's operation software. Water purified through Milli-Q system (ρ>18 MΩ-cm, Millipore Inc.) was used as the main probe fluid, while water-methanol mixtures and other organic solvent used as a low-surface probe liquid, as indicated in Table 2, below.

TABLE 2 surface tensions of liquids used for contact angle measurements

| Liquid | Surface Tension (mN/m) | Liquid | Surface Tension (mN/m) |
|---|---|---|---|
| Water | 72.8 | Hexdecane | 27.6 |
| Oliver oil | 34.6 | Octane | 21.8 |
| Water-Methanol (MeOH vol %) | | | |
| 0.00 | 72.8 | 29.41 | 44.1 |
| 2.24 | 67.8 | 35.53 | 41.4 |

TABLE 2-continued surface tensions of liquids used for contact angle measurements

| Liquid | Surface Tension (mN/m) | Liquid | Surface Tension (mN/m) |
|---|---|---|---|
| 4.71 | 62.9 | 45.45 | 37.8 |
| 6.66 | 62.5 | 55.75 | 34.5 |
| 7.39 | 59.7 | 65.41 | 31.8 |
| 12.67 | 55.0 | 74.83 | 28.9 |
| 17.84 | 51.3 | 80.71 | 25.2 |
| 23.81 | 47.7 | 100.00 | 22.3 |

For sessile drop test, images were photographed by putting a 4 µL water droplet onto at least 5 different areas of the sample. The needle was lowered towards to the sample to carefully place drops on the surface, and then the needle was removed from the drop. For surfaces with extreme hydrophobicity, the drops may not remain stably in place on the surface and the needle was kept in contact with the drop during the angle measurement. The captured images were analyzed using the Drop-Snake plug-in of systems ImageJ software. The mean value of the water contact angle and its standard deviation were reported as contact angle ($\theta_c$).

Dynamic Contact Angle Measurement

Advancing angle and receding angle were measured by goniometer. Images for advancing angle were recorded as follows: fluid was gradually added to the droplet, typically 0.05 µL at a time, and images were captured after each introduction of fluid. The advancing angle was determined from the image frame before the advance of the liquid interface was observed. Receding angle determination was performed by the same process by withdrawing the fluid from the droplet. The receding angle was determined from the image frame before retreat of the liquid interface was observed. Measurements were performed at three different places for each sample.

Surface Tension Determination

Figure 11:
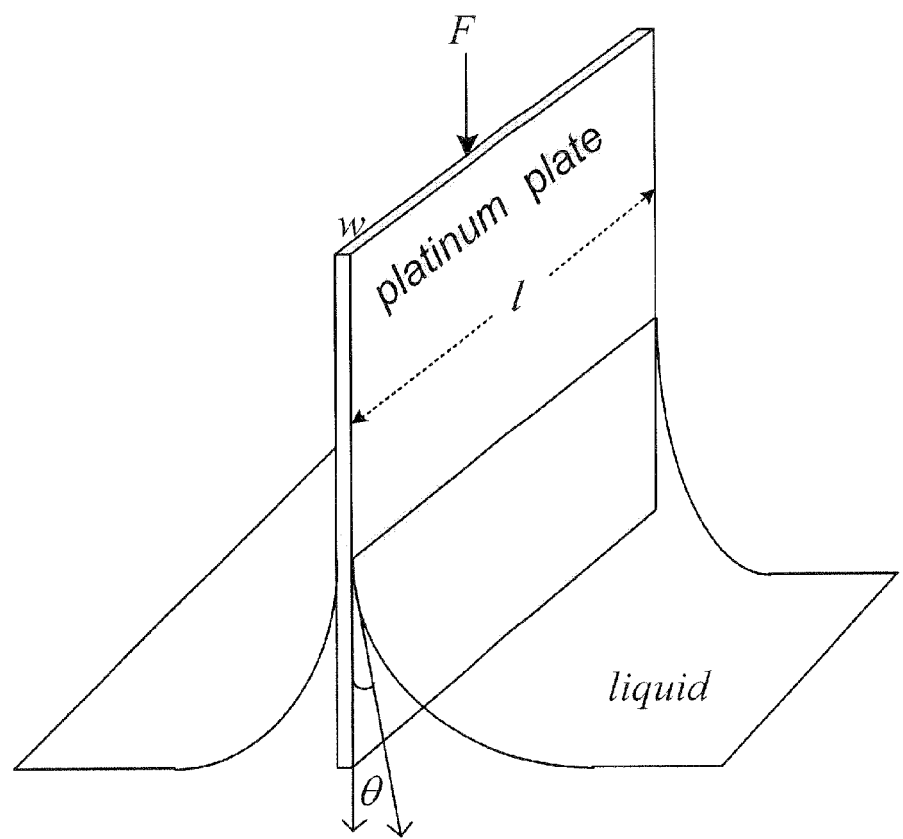
FIG. 11 schematically illustrates the Wilhelmy plate method employed for measuring liquid surface tension.

The surface tension of the liquid used for contact angle measurement was measured by the Wilhelmy plate method. The method consists of a thin platinum plate hanging under a microbalance via a thin metal wire. The platinum surface was roughened, along with its high surface energy, to ensure complete wetting ($\theta \sim \theta°$). Before the measurement, the platinum plate was fired by a gas burner, and then rinsed with acetone and DI water to thoroughly remove any substances on the surface. The plate was immersed into the liquid and then the container was gradually lowered away from the plate. The force on the plate due to wetting was shown on the microbalance. The surface tension (γ) of the liquid can be calculated by using the Wilhelmy equation:

$$\gamma = F/L \cdot \cos \theta$$

where L is the wetted perimeter (2w+2l) of the Wilhelmy plate and θ is the contact angle between the liquid phase and the plate (FIG. 11). In practice the contact angle is rarely measured, complete wetting (cos θ=1) is usually assumed for the calculation.

Contact Area and Theoretical Contact Angle Interpretation

Theoretical contact angles, $\theta_{C-B}$, were calculated by using the Cassie-Baxter equation:

$$\cos \theta_{C-B} = f_s(\cos \theta_c + 1) - 1$$

where $\theta_c$ is the contact angle measured on the uncast, original substrate, and $f_s$ is the area fraction of the droplet in contact with cast structure. The cast structure is generally not regular, so the fraction of contact area was estimated through analyzing the top-viewed SEM pictures using ImageJ software where brightest regions of the SEM picture correspond to emission of secondary electrons, which is higher at higher elevations, and assumed to be the surface in contact with the liquid droplet. By adjusting the threshold, a range of the contact area fractions was determined using the software.

Water Contact Angles of Molded Thermoplastic Base Surface

The data determined from the images of the sessile drops and the areas associated with the article's microstructures were combined to elucidate the values of contact angles, advancing angles, receding angles, estimated contact areas, and theoretical contact angles for all article surfaces are listed in Table 3, below.

the tilted surface (>10°) leaving the surface unwetted. Water drops bounced upon impacting the surfaces having smaller angle hysteresis (<20°).

If the cast temperature is not high enough, the lower viscosity may hinder the filling process making the height of the protrusions not tall enough to maintain the droplets in Cassie-Baxter state. As shown in FIG. 13d, a PP substrate molded at a lower temperature, 170° C. has only short fibers on the surface and droplets tend to stick to the surface. FIG. 13f shows a surface formed by dissolving isotactic-PP in p-xylene at 130° C., and dip coating the solution onto silicon substrates. Upon solidifying of the i-PP upon cooling, a porous network structure was formed that raises the contact angle to about 150° with a high contact angle hysteresis at

TABLE 3

Contact angles of molded thermoplastic surfaces and contact angles calculated from the Cassie-Baxter Equation above.

| Pore Size | Contact Angle ($\theta_c$) | Advancing Angle ($\theta_{adv}$) | Receding Angle ($\theta_{rec}$) | Contact Angle Hysteresis ($\Delta\theta$) | Estimated Contact Area Fraction ($f_s$) | Cassie-Baxter Contact Angles ($\theta_{cb}$) |
|---|---|---|---|---|---|---|
| PP (Polypropylene) | | | | | | |
| Original sheet | 94 ± 0.7° | 98 ± 2.1° | 75 ± 2.6° | 23° | — | — |
| Membrane-dissolved | | | | | | |
| 0.6 µm | 155 ± 3.6° | 161 ± 3.7° | 147 ± 3.1° | 24° | 8%-14% | 157.7°-150.4° |
| 1.2 µm | 153 ± 3.6° | 159 ± 4.9° | 111 ± 3.1° | 48° | 15%-18% | 149.3°-146.3° |
| 3.0 µm | 147 ± 1.9° | 169 ± 1.6° | 113 ± 6.3° | 56° | 22%-24% | 142.6°-140.9° |
| Membrane-peeled | | | | | | |
| 0.6 µm | >170° | >170° | >170° | <1° | 1%-3% | 172.1°-166.4° |
| 1.2 µm | 157 ± 3.8° | 160 ± 4.3° | 152 ± 3.1° | 8° | 10%-18% | 155.0°-146.3° |
| 3.0 µm | 152 ± 4.0° | 162 ± 2.5° | 145 ± 4.4° | 17° | 18%-24% | 146.3°-140.9° |
| 0.6 µm membrane-peeled | | | | | | |
| 170° C. mold | 134 ± 5.5° | 138 ± 6.3° | 91 ± 6.4° | 47° | | |
| 200° C. mold | 163 ± 4.2° | 164 ± 1.8° | 154 ± 4.8° | 10° | | |
| Dissolved-resolidfied | 151 ± 4.2° | 162 ± 4.7° | 135 ± 4.0° | 27° | | |
| LDPE (Low-density Polyethylene) | | | | | | |
| Original sheet | 91 ± 2.3° | 93 ± 1.3° | 70 ± 4.6° | 23° | — | — |
| 0.6 µm | 134 ± 4.0° | 150 ± 4.2° | 127 ± 2.5° | 23° | 32%-40% | 133.3°-127.4° |
| 1.2 µm | 154 ± 5.7° | 159 ± 4.5° | 152 ± 2.6° | 7° | 25%-37% | 129.5°-139.0° |
| 3.0 µm | 141 ± 2.3° | 151 ± 3.2° | 146 ± 3.5° | 5° | 20%-28% | 136.4°-143.5° |
| PVDF (Polyvinylidene Fluoride) | | | | | | |
| Original sheet | 81 ± 1.6° | 82 ± 0.5° | 42 ± 5.1° | 38° | — | — |
| 0.6 µm | 152 ± 2.7° | 159 ± 2.9° | 133 ± 5.8° | 26° | 10%-15% | 152.1°-145.7° |
| 1.2 µm | 147 ± 1.8° | 153 ± 2.0° | 112 ± 5.3° | 41° | 20%-25% | 140.2°-135.3° |

Polypropylene Surfaces

The unmolded PP sheet is relatively hydrophobic, and has a contact angle slightly larger than 90°. The images of sessile drop measurement on membrane molded PP surfaces are shown in FIGS. 12 and 13 for dissolved and delaminated molds, respectively. The contact angles on these surfaces are above or around 150°, significantly increased over unmolded PP sheet (94±0.7°), FIG. 12a. The contact angles increase with the decrease of the mold's pore size and are well estimated by the Cassie-Baxter equation. Membrane-delaminated surfaces display higher contact angles than membrane-dissolved surfaces. Smaller contact angle hysteresis (difference between advancing and receding angles) for membrane-delaminated surfaces is also observed. Membrane-dissolved surfaces also display greater contact angle hysteresis. Despite contact angle difference, macroscopic wetting behaviors of these surfaces are similar: water drops (~50 µL) falling from several centimeters easily rolled off 27°, which is significantly inferior to the superhydrophobic surfaces according to the present invention.

LDPE Surfaces

Figure 14A:
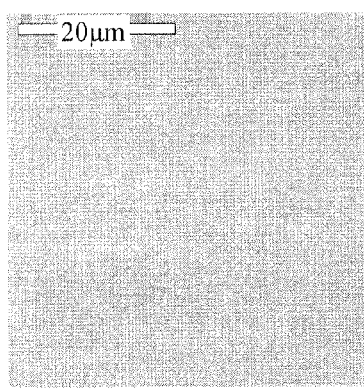
FIG. 14 shows SEM images that display surface morphologies and sessile water drop images for an unmolded LDPE article (a) and PC membrane molded LDPE articles using membranes with 3.0 µm (b), 1.2 µm (c), and 0.6 µm (d) pores.
Figure 14B:
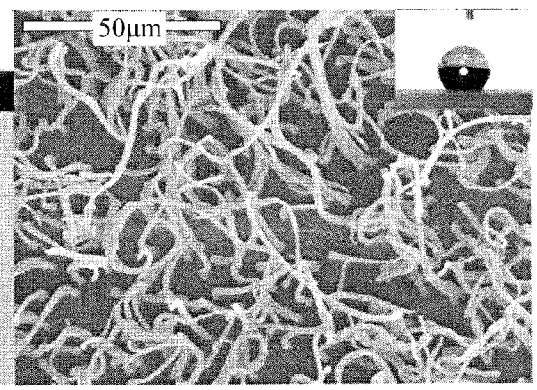
Figure 14C:
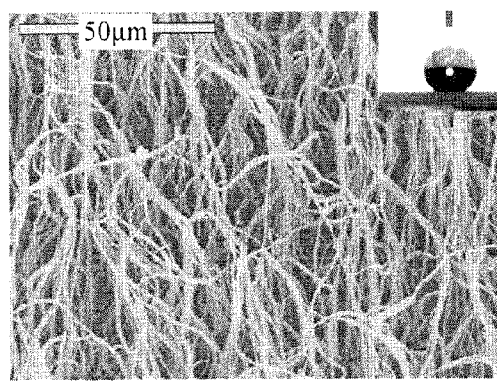
Figure 14D:
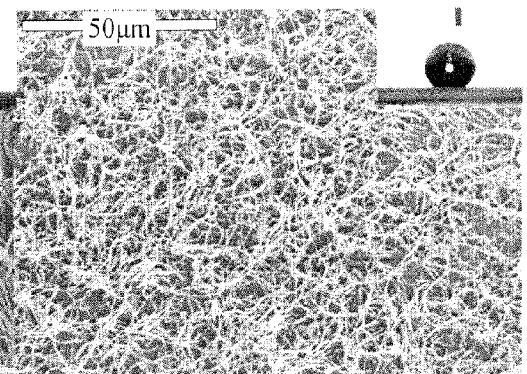

Similar to the PP surfaces, LDPE sheet has a contact angle around 90° FIG. 14a. The delamination process basically rendered the LDPE surfaces into a soft, thick fiber-mat. In contrast to PP or PVDF, as can be seen in FIG. 14b-d high density fibers on 0.6 µm-membrane molded surface were not sheared, but stretched to highly entangled fibers which greatly increased the fraction of the area contacting the water drops resulting in a lower contact angle of 134° and a high hysteresis (~23°). The 1.2 µm and 3.0 µm-membrane molded surfaces showed higher contact angles (>140°), and low contact angle hysteresis) (~5° making the surfaces superior water repellent.

PVDF Surfaces

Figure 15A:
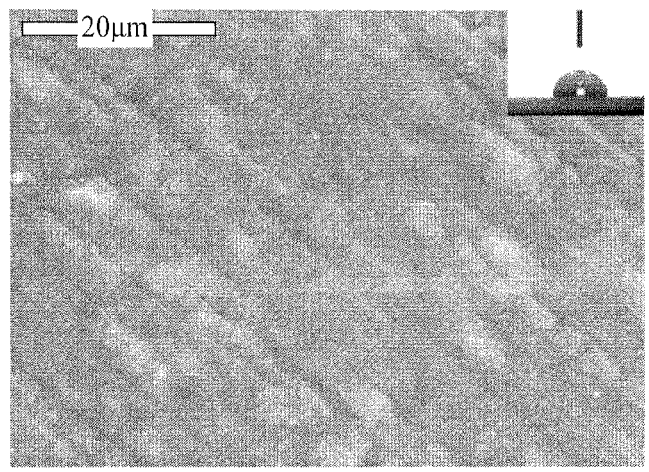
FIG. 15 shows SEM images that display surface morphologies and sessile water drop images for an unmolded PVDF article (a) and PC membrane molded PVDF articles using membranes with 1.2 μm (b), and 0.6 μm (c) pores.
Figure 15B:
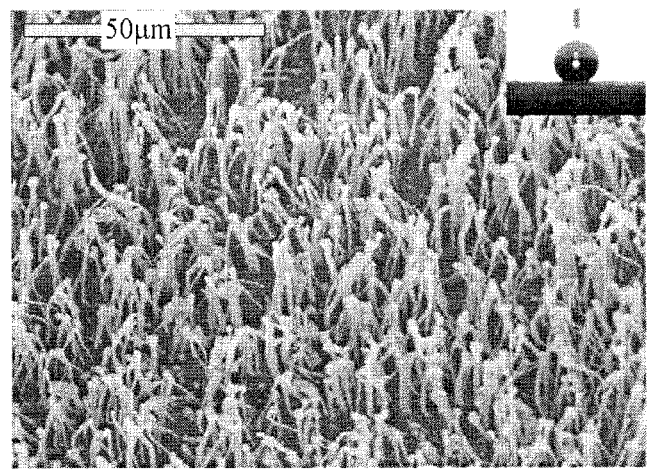
Figure 15C:
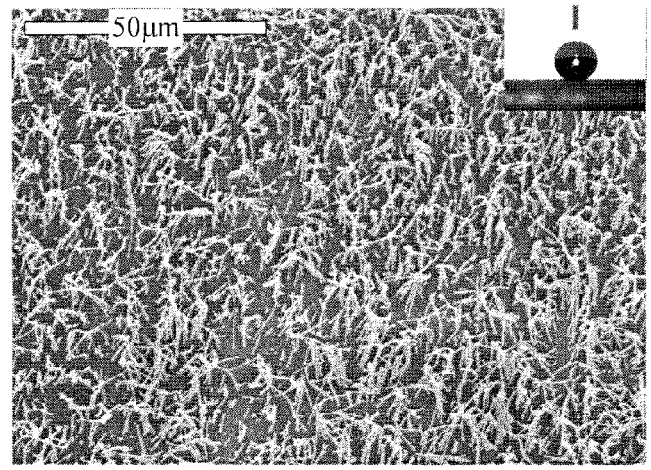

The contact angle on unmolded PVDF sheet is ~81°, FIG. 15a, hence, is considered to be hydrophilic. After casting, the contact angles were increased to around 150°, FIGS. 14*b-c*. Although the contact angles are almost equal, contact angle hysteresis of a 1.2 μm-membrane molded surface is 15 degrees higher than that of a 0.6 μm-membrane molded surface. The value is higher than PP and LDPE of 1.2 μm-membrane molded surfaces, and is attributed to its lower hydrophobicity nature and higher contact area of the pillar structure.

Conformal Perfluoroalkane Comprising Coated Thermoplastic Surfaces

Figure 16:
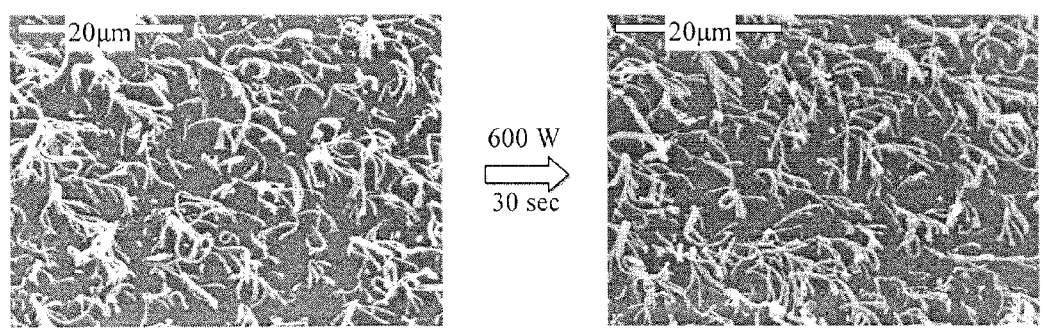
FIG. 16 shows SEM images of the surfaces of uncoated PP articles from articles molded using PC membrane and delaminated, having a pore size of ϕ=1.2 μm before (a) and after (b) plasma deposition of a perfluoroalkane comprising layer on the surface using a DRIE chamber, according to an embodiment of the invention.

Fluorocarbon layers were applied in a control manner by plasma deposition of perfluoroalkane onto molded superhydrophobic PP surfaces. As shown in FIG. 16, the fiber structure remains upon plasma deposition. In contrast to the plasma deposition technique, plasma polymerization of a $C_4F_8$ coating did not yield a conformal coating.

Figure 17:
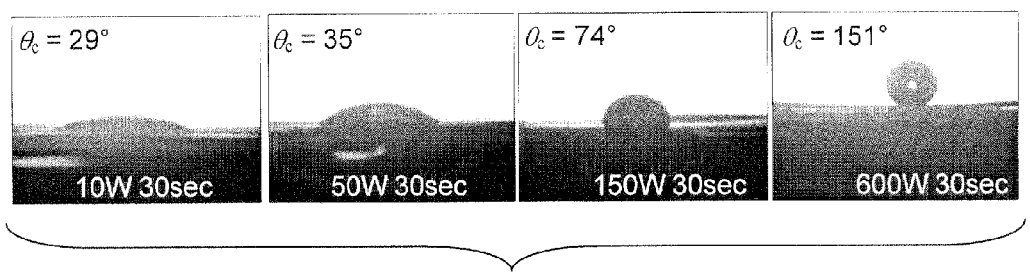
FIG. 17 shows sessile drop images and measured contact angles for methanol-water mixture (γ~25.2 mN/m) on a perfluoroalkane comprising coated surfaces of molded PP articles, according to embodiments of the invention, where the coating was applied at different plasma powers.
Figure 18A:
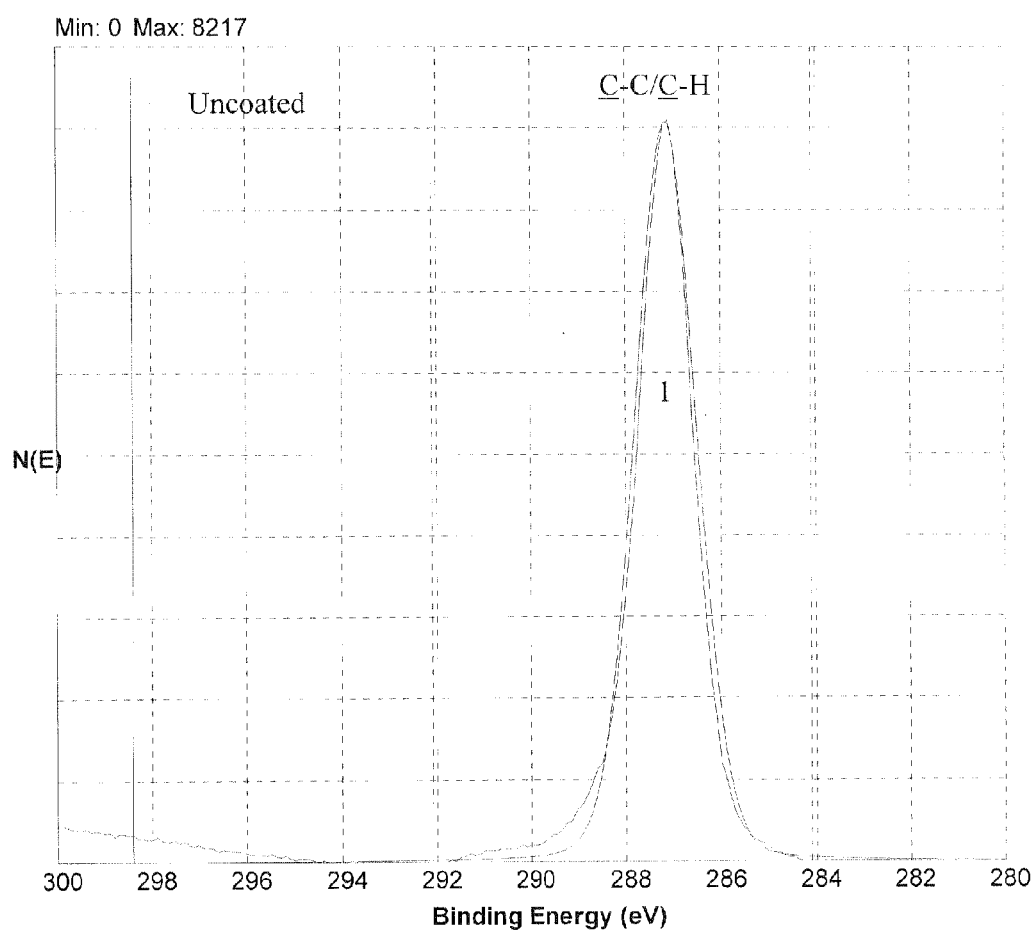
FIG. 18 shows C(1s) XPS spectra for perfluoroalkane comprising coated molded PP articles, according to embodiments of the invention, where the perfluoroalkane comprising coating was carried out at different plasma powers.
Figure 18B:
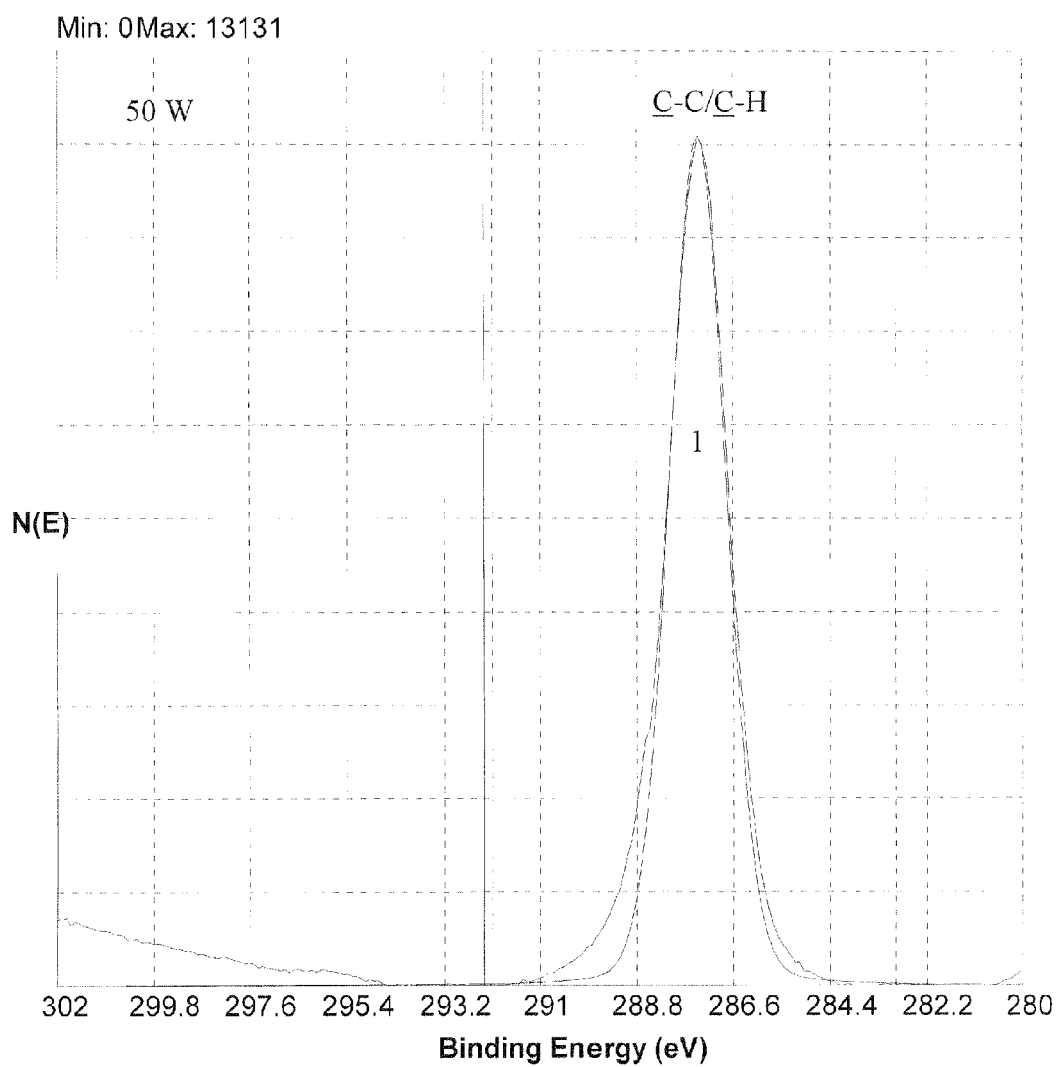
Figure 18C:
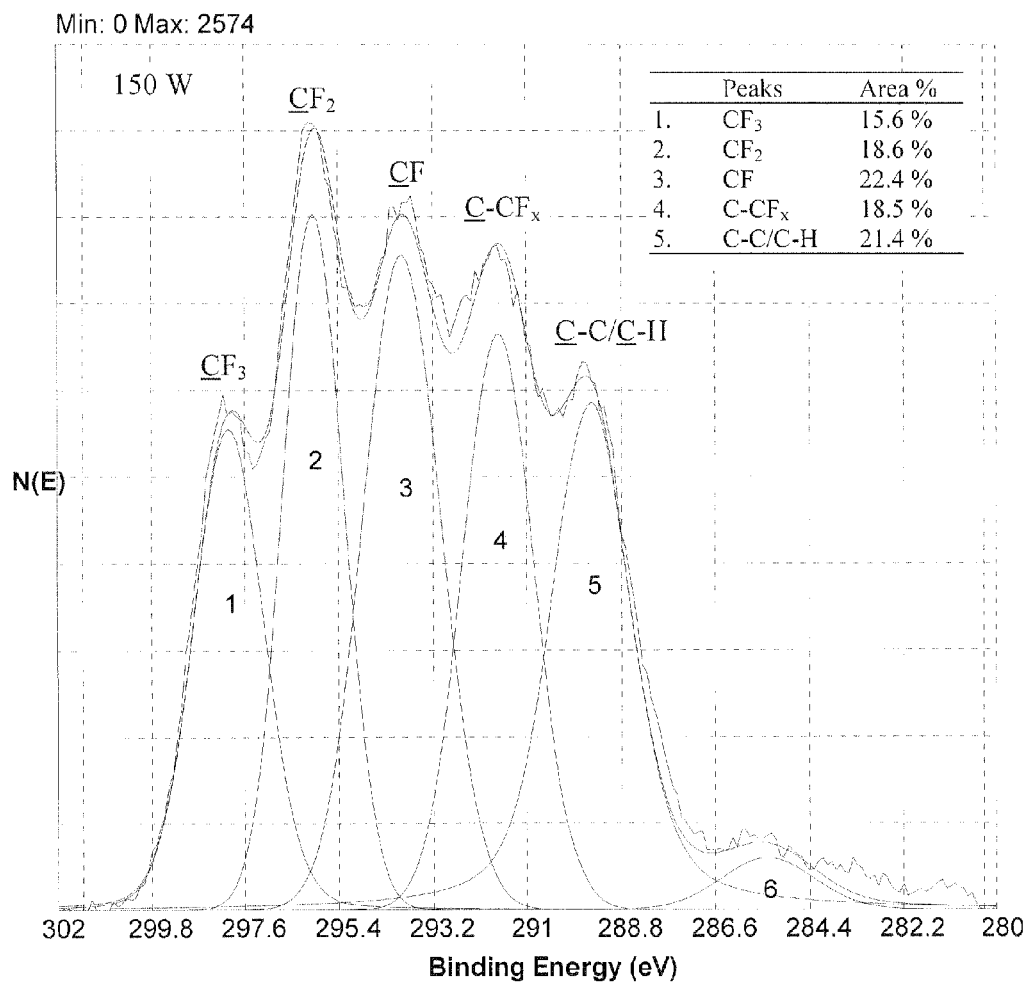
Figure 18D:
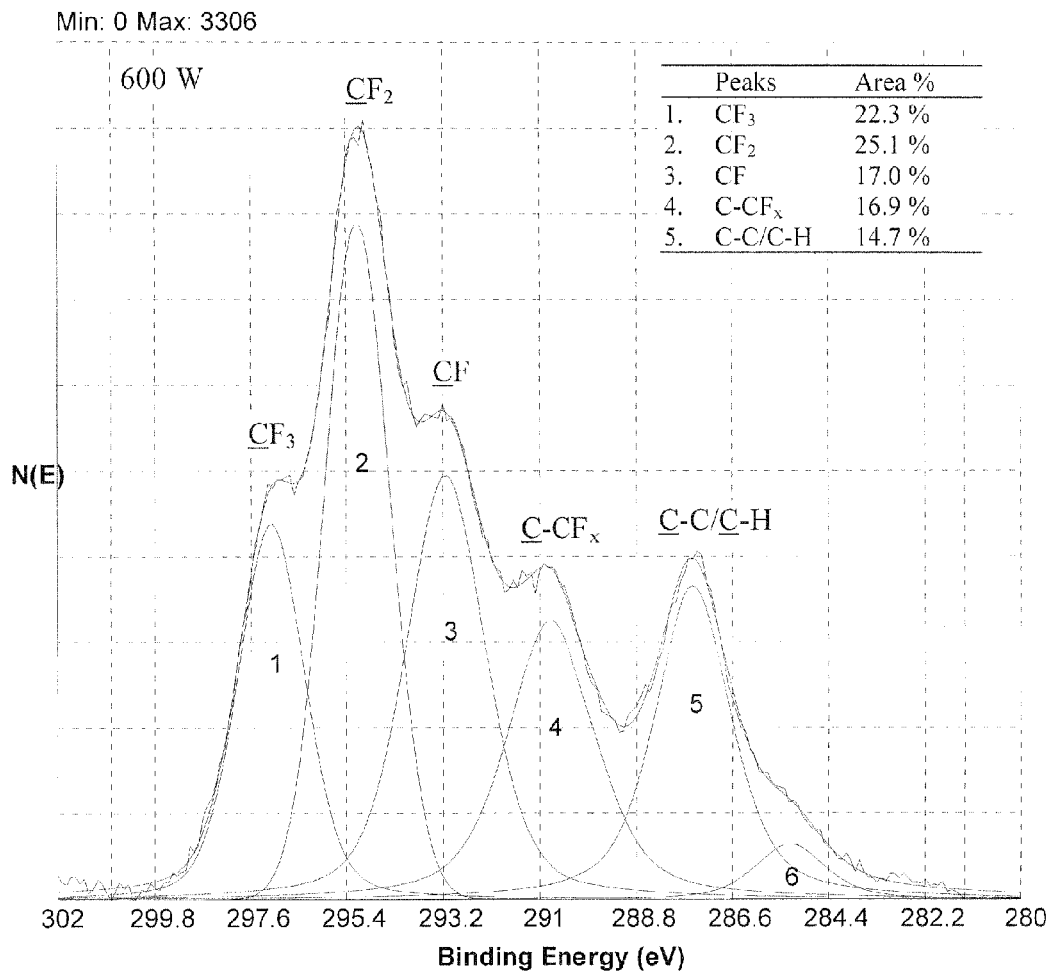

A perfluoroalkane comprising layer on an unmolded PP sheet increases the water contact angle from 94° to around 100°. FIG. 17 shows a methanol-water mixture ($\gamma$~25.2 mN/m) on molded PP surfaces coated with perfluoroalkane comprising layers using different plasma powers. The contact angles of this low surface tension liquid increased with the increase of plasma power employed for the perfluoroalkane comprising layer deposition. In contrast to many fluorocarbon precursors, the film deposited from $C_4F_8$ is more sensitive to the applied RF power than are other smaller fluoro-carbons for example $CF_4$ or $C_2F_6$. The C(1s) signal in an XPS spectra of the conformal coating showed that the concentration of $CF_2$ increases as the power increases, FIG. 18, indicating a higher proportion of polymerization of $C_4F_8$ during perfluoroalkane comprising coating deposition.

Figure 19:
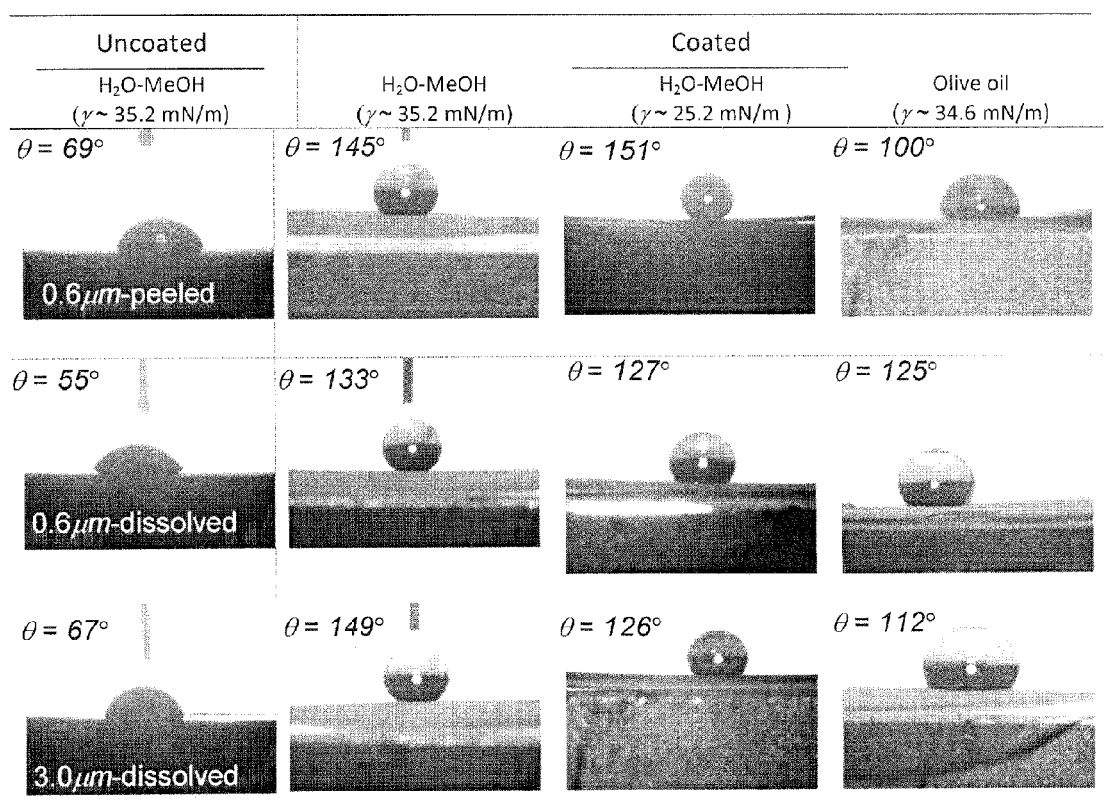
FIG. 19 shows sessile drop images and measured contact angles for various low surface tension liquids on molded PP articles before and after perfluoroalkane comprising coatings, according to embodiments of the invention.

FIG. 19 shows images of the sessile drops on uncoated and perfluoroalkane comprising coated molded PP surfaces. The contact angles of water-methanol droplets displayed a significant increase from less than 70° to more than 130°. The contact angle of olive oil increased to over 100°.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A superhydrophobic and oleophobic article comprising a thermoplastic or thermoset substrate having at least a portion of the article's surface having a multiplicity of re-entrant structures comprising thermoplastic or thermoset flexible fibers of various lengths protruding and extending randomly from the thermoplastic or thermoset substrate surface, wherein at least a portion of the thermoplastic or thermoset flexible fibers are not perpendicular to the article's surface, and wherein at least the distal portion of the re-entrant structure's surface comprises a conformal coating that comprises a perfluoroalkane.

2. The article of claim 1, wherein the thermoplastic substrate and thermoplastic flexible fibers comprises polypropylene, polyethylene, polystyrene, polymethylmethacrylate, nylon, polyethylene terephthalate, polybutylene terephthalate, or polycaprolactone.

3. The article of claim 1, wherein the re-entrant structures further comprise solid bumps.

4. The article of claim 1, wherein the fibers have a ratio of elastic modulus to aspect ratio of about 1 to about 20 MPa.

5. A method of preparing a superhydrophobic and oleophobic article comprising:
providing a thermoplastic;
providing a mold with at least a portion of its surface having a multiplicity of voids with at least one dimension being about 100 nm to about 10 μm, wherein the mold is constructed of a material that does not undergo flow at a temperature at which the thermoplastic undergoes flow;
contacting the thermoplastic to the mold's surface with an applied pressure at the temperature where the thermoplastic undergoes flow to shape the thermoplastic article;
cooling the thermoplastic article and mold below the temperature of thermoplastic flow;
removing the thermoplastic article from the mold, wherein the thermoplastic article has a surface that is complementarily shaped to the contacted mold's surface and having a multiplicity of re-entrant structures comprising thermoplastic flexible fibers of various lengths extending randomly from the base on the surface, wherein at least a portion of the thermoplastic flexible fibers are not perpendicular to the surface, and
depositing a conformal coating that comprises a perfluoroalkane upon at least the distal portion of the re-entrant structures.

6. The method of claim 5, wherein the thermoplastic comprises polypropylene, polyethylene, polystyrene, polymethylmethacrylate, nylon, polyethylene terephthalate, polybutylene terephthalate, or polycaprolactone.

7. The method of claim 6, wherein the mold is constructed of a second thermoplastic having a melting temperature in excess of the thermoplastic of the thermoplastic article.

8. The method of claim 7, wherein the second thermoplastic is soluble in a solvent that is a non-solvent for the thermoplastic of the thermoplastic article and wherein removing comprises dissolving the mold in a solvent that is a non-solvent for the thermoplastic of the thermoplastic article.

9. The method of claim 5, wherein removing comprises delaminating the thermoplastic article from the mold.

10. The method of claim 5, wherein depositing the conformal coating comprises plasma deposition of a perfluoroalkane.

11. The method of claim 5, wherein depositing the conformal coating comprises solution deposition of a reagent comprising a perfluoroalkane portion and a portion comprising a chemical functionality reactive with a complementary chemical functionality on the surface of the thermoplastic article.

12. The method of claim 5, further comprising mixing carbon nanotubes in the thermoplastic.

13. A method of preparing a superhydrophobic and oleophobic article according to claim 1, comprising:
providing a polymerizable coating on a surface of an article;
pulling extended fibers of the polymerizable coating from a portion of the coating;
polymerizing the polymerizable coating including the extended fibers to form a thermoplastic or thermoset, wherein the polymerized extended fibers are randomly oriented fibers of various lengths that exhibit re-entrant structures; and depositing a conformal coating that comprises a perfluoroalkane upon at least the distal portion of the re-entrant structures.

14. The method of claim 13, wherein the article comprises a thermoplastic, a duroplastic, a thermoset, a ceramic, a glass, or a metal.

15. The method of claim 13, wherein the extended fibers are pulled using a needle bed.

* * * * *

UNITED STATES PATENT AND TRADEMARK OFFICE
CERTIFICATE OF CORRECTION

PATENT NO. : 9,475,105 B2
APPLICATION NO. : 13/884059
DATED : October 25, 2016
INVENTOR(S) : Wolfgang M. Sigmund and Shu-Hau Hsu It is certified that error appears in the above-identified patent and that said Letters Patent is hereby corrected as shown below:

In the Specification

Column 2,
Line 15, "$\gamma_{SV} = \gamma_{LV}/4$. '" should read --$\gamma_{SV} = \gamma_{LV}/4$--.
Line 51, "with a frilly" should read --with a fully--.

Column 4,
Line 1, "membranes and" should read --membrane and--.
Line 20, "--$\phi$=01.2$\mu m$" should read --$\phi$=1.2$\mu m$--.
Line 21, "$\phi$=10.6$\mu m$" should read --$\phi$=0.6$\mu m$--.
Line 32, "$\phi$=6$\mu m$ (e) and (0, where" should read --$\phi$=0.6$\mu m$ (e) and (f), where--.
Line 61, "from a Si" should read --from an Si--.

Column 5,
Lines 32-33, "invention the" should read --invention, the--.

Column 7,
Line 65, "Alternatively the" should read --Alternatively, the--.

Column 9,
Line 47, "and 3.0 $\mu m$" should read --and 3.0 $\mu m$.--.

Column 11,
Line 63, "Oliver oil" should read --Olive oil--.

Column 14,
Line 63, "(~5° making" should read --(~5°) making--.

Signed and Sealed this
Eleventh Day of April, 2017

Michelle K. Lee
*Director of the United States Patent and Trademark Office*

CERTIFICATE OF CORRECTION (continued)
U.S. Pat. No. 9,475,105 B2

In the Claims

<u>Column 15,</u>
Line 62, "fibers comprises" should read --fibers comprise--.